(12) United States Patent
Chen

(10) Patent No.: US 9,380,289 B2
(45) Date of Patent: Jun. 28, 2016

(54) PARAMETER SETS IN VIDEO CODING

(71) Applicant: QUALCOMM Incorporated, San Diego, CA (US)

(72) Inventor: Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 13/945,618

(22) Filed: Jul. 18, 2013

(65) Prior Publication Data

US 2014/0022343 A1  Jan. 23, 2014

Related U.S. Application Data

(60) Provisional application No. 61/673,918, filed on Jul. 20, 2012, provisional application No. 61/680,556, filed on Aug. 7, 2012.

(51) Int. Cl.
*H04N 13/00* (2006.01)
*H04N 19/70* (2014.01)
*H04N 19/463* (2014.01)
*H04N 19/597* (2014.01)
*H04N 19/30* (2014.01)

(52) U.S. Cl.
CPC ......... *H04N 13/0048* (2013.01); *H04N 19/463* (2014.11); *H04N 19/70* (2014.11); *H04N 19/30* (2014.11); *H04N 19/597* (2014.11)

(58) Field of Classification Search
CPC . H04N 13/0048; H04N 19/30; H04N 19/463; H04N 19/597; H04N 19/70
See application file for complete search history.

(56) References Cited

U.S. PATENT DOCUMENTS

| | | | |
|---|---|---|---|
| 2007/0291837 A1* | 12/2007 | Eleftheriadis | .. H04N 21/234327 375/240.02 |
| 2010/0091881 A1 | 4/2010 | Pandit et al. | |
| 2010/0266042 A1 | 10/2010 | Koo et al. | |
| 2011/0255796 A1* | 10/2011 | Nakamura | ........... H04N 19/597 382/232 |

(Continued)

FOREIGN PATENT DOCUMENTS

| WO | 2012105265 A1 | 8/2012 |
|---|---|---|
| WO | 2013016231 A1 | 1/2013 |
| WO | 2013030458 A1 | 3/2013 |

OTHER PUBLICATIONS

ITU-T, H.264 Series H: AudioVisual and Multimedia Systems, ITU, Mar. 2010, pp. 1-676.*

(Continued)

*Primary Examiner* — Sath V Perungavoor
*Assistant Examiner* — Peter D Le
(74) *Attorney, Agent, or Firm* — Shumaker & Sieffert, P.A.

(57) ABSTRACT

A video parameter set (VPS) is associated with one or more coded video sequences (CVSs). The VPS includes a VPS extension for a video coding extension. The VPS extension includes a syntax element that indicates whether a video coding tool associated with the video coding extension is enabled for a set of applicable layers of a bitstream. When the syntax element indicates that the coding tool is enabled for the applicable layers, at least a portion of the video data that is associated with the CVSs and that is associated with the applicable layers is coded using the coding tool. When the syntax element indicates that the coding tool is not enabled for the applicable layers, the video data that is associated with the CVSs and that is associated with the applicable layers is not coded using the coding tool.

36 Claims, 10 Drawing Sheets

(56) References Cited

U.S. PATENT DOCUMENTS

| | | | |
|---|---|---|---|
| 2012/0023249 A1 | 1/2012 | Chen et al. | |
| 2012/0044322 A1* | 2/2012 | Tian | H04N 19/597 348/43 |
| 2012/0219069 A1 | 8/2012 | Lim et al. | |
| 2012/0236115 A1 | 9/2012 | Zhang et al. | |
| 2014/0023138 A1 | 1/2014 | Chen | |

OTHER PUBLICATIONS

Boyce, et al., "Information for scalable extension high layer syntax", JCT-VC Meeting; MPEG Meeting; San Jose; (Joint Collaborative Team on Video Coding of ISO/ IEC JTC1/SC29/WG11 and ITU-T SG.16 ); URL:http://wftp3.itu.int/AV-ARCH/JCTVC-SITE/, No. JCTVC-H0386, Jan. 21, 2012, 7 pp.

Boyce, et al., "SEI Message for profile and level signaling for temporal scalability and extensions", JCT-VC Meeting; 101. MPEG Meeting; Stockholm; (Joint Collaborative Team on Video Coding of ISO/IEC JTC1/SC29/WG11 and ITU-T SG.16 ); URL:http://wftp3.itu.int/AV-ARCH/JCTVC-SITE/, No. JCTVC-J0245, Jul. 2, 2012, XP030112607, 6 pp.

Boyce, et al., "High level syntax hooks for future extensions", JCT-VC Meeting; MPEG Meeting; San Jose; (Joint Collaborative Team on Video Coding of ISO/IEC JTC1/SC29/WG11 and ITU-T SG.16); URL: http:// wftp3. itu.int/av-arch/jctvc-site/, No. JCTVC-H0388, Jan. 21, 2012 XP030111415, 8 pp.

Boyce, et al., "VPS syntax for scalable and 3D extensions", JCT-VC Meeting; MPEG Meeting; Stockholm; (Joint Collaborative Team on Video Coding of ISO/IEC JTC1/SC29/WG11 and ITU-T SG.16 ); URL: http://wftp3.itu.int/av-arch/jctvc-site/, No. JCTVC-J0576, Jul. 18, 2012 XP030112938, 3 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross, et al., "High efficiency video coding (HEVC) text specification draft 7 (JCTVC-I1003 d6)", Joint Collaborative Team on Video Coding (JCT-VC) of ITU-T SG16 WP3 and ISO/IEC JTC1/SC29/WG11 9th Meeting: Geneva, CH, Apr. 27-May 7, 2012, pp. 1-258, XP055060259, [uploaded in parts].

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen, et al., "AHG10: On video parameter set for HEVC extensions," JCT-VC Meeting; MPEG Meeting; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0124, Jul. 3, 2012, 15 pp.

Chen, et al., "AHG10: Video parameter set for HEVC base specification", 10. JCT-VC Meeting; 101. MPEG Meeting; Jul. 11-20, 2012; Stockholm; (Joint Collaborative Team on Video Coding of ISO/IEC JTC1/SC29/WG11 and ITU-T SG.16 ); URL: URL:http://wftp3.itu.int/AV-ARCH/JCTVC-SITE/, No. JCTVC-J0114, 15 pp.

Chen, et al., "AHG12: Video parameter set and its use in 3D-HEVC ", JCT-VC Meeting; MPEG Meeting; Apr. 27-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-I0571, XP030112334, 9 pp.

Choi, et al., "AHG7: Video parameter set extension design for MV-HEVC and 3D-HEVC", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16);URL: http://phenix.int-evry.fr/jct2/, No. JCT3V-C0106, XP030130522, 6 pp.

Hannuksela, et al., "Hook for Scalable Extensions:Video Parameter Set",9. JCT-VC Meeting; 100. MPEG Meeting; Apr. 27-May 7, 2012; Geneva; (Joint Collaborative Team on Video Coding of ISO/IEC JTC1/SC29/WG11 and ITU-T SG.16 ); URL:http://wftp3.itu.int/av-arch/jctvc-site/, No. JCTVC-I0524, XP030112287, 6 pp.

Ikai, et al., "AHG7:On VPS extension", JCT-3V Meeting; MPEG Meeting; Jan. 17-23, 2013; Geneva; (The Joint Collaborative Team on 3D Video Coding Extension Development of ISO/IEC JTC1/SC29/ WG11 and ITU-T SG.16); URL:http://phenix.int-evry.fr/jct2/, No. JCT3V-C0086, XP030130502, 6 pp.

International Preliminary Report on Patentability from International Application No. PCT/US2013/051344, dated Oct. 13, 2014,10 pp.

International Search Report and Written Opinion from International Application No. PCT/US2013/051344, dated Sep. 6, 2013, 15 pp.

ITU-T H.264, Series H: Audiovisual and Multimedia Systems, Infrastructure of audiovisual services—Coding of moving video, Advanced video coding for generic audiovisual service, The International Telecommunication Union. Jun. 2011, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

Muller, et al., "3D High-Efficiency Video Coding for Multi-View Video and Depth Data," IEEE Transactions on Image Processing, Special Issue on 3D Video Representation, Compression and Rendering, 2013, 13 pp.

Skupin, et al., "AHG9/AHG10: Design of the Video Parameter Set", JCT-VC Meeting; MPEG Meeting; Jul. 11-20, 2012; Stockholm; (Joint Collaborative Team on Video Cooing of ISO/IEC JTC1/SC29/WG11 and ITU-T SG.16); URL: http://wftp3.itujnt/av-arch/jctvc-site/, No. JCTVC-J0257,XP030112619, 9 pp.

Sullivan, et al., "Overview of the High Efficiency Video Coding (HEVC) Standard", IEEE Transactions on Circuits and Systems for Video Technology, IEEE Service Center, Piscataway, NJ, US, vol. 22 (12), Dec. 1, 2012, XP011486324, pp. 1649-1668.

Tech, et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V-B1005_d0, 2nd Meeting: Shanghai, CN, XP030130414, Oct. 13-19, 2012, 118 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wang "Report of BoG on high-level syntax for extension planning", JCT-VC Meeting; MPEG Meeting; Jul. 11-20, 2012 Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J0574, XP030112936, 17 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Second Written Opinion from International Application No. PCT/US2013/0531344, dated Jul. 17, 2014, 8 pp.

Bross et al., "WD4: Working Draft 4 of High-Efficiency Video Coding," 6th Meeting: JCTVC-F803_d1, Torino, IT, Jul. 14-22, 2011, 222 pp.

* cited by examiner

PARAMETER SETS IN VIDEO CODING

This application claims the benefit of U.S. Provisional Patent Application No. 61/673,918, filed Jul. 20, 2012, and U.S. Provisional Patent Application No. 61/680,556, filed Aug. 7, 2012, the entire content of each of which are incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multi-view plus depth coding. In multi-view plus depth coding, 3D video bitstreams may contain not only texture view components, but also depth view components. For example, each view may comprise one texture view component and one depth view component.

SUMMARY

In general, this disclosure describes techniques related to video parameter sets (VPSs) and sequence parameter sets (SPSs) in extensions of video codecs, such as High-Efficiency Video Coding (HEVC). A video parameter set (VPS) is associated with one or more coded video sequences (CVSs). The VPS includes a VPS extension for a video coding extension, such as a multi-view video coding extension, a scalable video coding (SVC) extension, or a 3D video coding (3DV) extension to HEVC. The VPS extension includes respective syntax elements for each respective layer of a video data bitstream. For each respective layer of the video data bitstream, when the syntax element for the respective layer indicates that a coding tool is enabled for the respective layer, at least a portion of the video data that is associated with the one or more CVSs and that is associated with the respective layer is decoded using the coding tool. When the syntax element for the respective layer indicates that the coding tool is not enabled for the respective layer, the video data that is associated with the CVSs and that is associated with the respective layer is not decoded using the coding tool.

In one example, this disclosure describes a method of decoding video data, the method comprising: obtaining, from a video data bitstream, a VPS extension for a video coding extension, the VPS extension being a syntax structure within a VPS, the VPS being a syntax structure that is applicable to one or more entire coded video sequences, the VPS extension including a syntax element that indicates whether a coding tool associated with the video coding extension is enabled for a set of applicable layers; when the syntax element indicates that the coding tool is enabled for the one or applicable layers, decoding, with use of the coding tool, at least a portion of video data that is associated with the one or more entire coded video sequences and that is associated with the set of applicable layers; and when the syntax element indicates that the coding tool is not enabled for the set of applicable layers, decoding, without use of the coding tool, the video data that is associated with the one or more entire coded video sequences and that is associated with the set of applicable layers.

In another example, this disclosure describes a video decoding device comprising one or more processors configured to: obtain, from a video data bitstream, a VPS extension for a video coding extension, the VPS extension being a syntax structure within a VPS, the VPS being a syntax structure that is applicable to one or more entire coded video sequences, the VPS extension including a syntax element that indicates whether a coding tool associated with the video coding extension is enabled for a set of applicable layers; when the syntax element indicates that the coding tool is enabled for the set of applicable layers, decode, with use of the coding tool, at least a portion of video data that is associated with the one or more entire coded video sequences and that is associated with the set of applicable layers; and when the syntax element indicates that the coding tool is not enabled for the set of applicable layers, decode, without use of the coding tool, the video data that is associated with the one or more entire coded video sequences and that is associated with the set of applicable layers.

In another example, this disclosure describes a video decoding device comprising: means for obtaining, from a video data bitstream, a VPS extension for a video coding extension, the VPS extension being a syntax structure within a VPS, the VPS being a syntax structure that is applicable to one or more entire coded video sequences, the VPS extension including a syntax element that indicates whether a coding tool associated with the video coding extension is enabled for a set of applicable layers; means for decoding, when the syntax element indicates that the coding tool is enabled for the set of applicable layers, with use of the coding tool, at least a portion of video data that is associated with the one or more entire coded video sequences and that is associated with the set of applicable layers; and means for decoding, when the syntax element indicates that the coding tool is not enabled for the set of applicable layers, without use of the coding tool, the video data that is associated with the one or more entire coded video sequences and that is associated with the set of applicable layers.

In another example, this disclosure describes a computer-readable data storage medium having instructions stored thereon that, when executed, configure a video decoding device to: obtain, from a video data bitstream, a VPS extension for a video coding extension, the VPS extension being a syntax structure within a VPS, the VPS being a syntax structure that is applicable to one or more entire coded video sequences, the VPS extension including a syntax element that indicates whether a coding tool associated with the video coding extension is enabled for a set of applicable layers; when the syntax element indicates that the coding tool is enabled for the set of applicable layers, decode, with use of the coding tool, at least a portion of video data that is associated with the one or more entire coded video sequences and that is associated with the set of applicable layers; and when the syntax element indicates that the coding tool is not enabled for the set of applicable layers, decode, without use of the coding tool, the video data that is associated with the one or more entire coded video sequences and that is associated with the set of applicable layers.

In another example, this disclosure describes a method of encoding video data, the method comprising: including, in a video data bitstream, a VPS extension for a video coding extension, the VPS extension being a syntax structure within a VPS, the VPS being a syntax structure that is applicable to one or more entire coded video sequences, the VPS extension including a syntax element that indicates whether a coding tool associated with the video coding extension is enabled for a set of applicable layers; and when the syntax element indicates that the coding tool is enabled for the set of applicable layers, encoding, with use of the coding tool, at least a portion of video data that is associated with the one or more entire coded video sequences and that is associated with the set of applicable layers; and when the syntax element indicates that the coding tool is not enabled for the set of applicable layers, encoding, without use of the coding tool, the video data that is associated with the one or more entire coded video sequences and that is associated with the set of applicable layers.

In another example, this disclosure describes a video encoding device comprising one or more processors configured to: include, in a video data bitstream, a VPS extension for a video coding extension, the VPS extension being a syntax structure within a VPS, the VPS being a syntax structure that is applicable to one or more entire coded video sequences, the VPS extension including a syntax element that indicates whether a coding tool associated with the video coding extension is enabled for a set of applicable layers; when the syntax element indicates that the coding tool is enabled for the set of applicable layers, encode, with use of the coding tool, at least a portion of video data that is associated with the one or more entire coded video sequences and that is associated with the set of applicable layers; and when the syntax element indicates that the coding tool is not enabled for the set of applicable layers, encode, without use of the coding tool, the video data that is associated with the one or more entire coded video sequences and that is associated with the set of applicable layers.

In another example, this disclosure describes a video encoding device comprising: means of including, in a video data bitstream, a VPS extension for a video coding extension, the VPS extension being a syntax structure within a VPS, the VPS being a syntax structure that is applicable to one or more entire coded video sequences, the VPS extension including a syntax element that indicates whether a coding tool associated with the video coding extension is enabled for a set of applicable layers; means for encoding, when the syntax element indicates that the coding tool is enabled for the set of applicable layers, with use of the coding tool, at least a portion of video data that is associated with the one or more entire coded video sequences and that is associated with the set of applicable layers; and means for encoding, when the syntax element indicates that the coding tool is not enabled for the set of applicable layers, without use of the coding tool, the video data that is associated with the one or more entire coded video sequences and that is associated with the set of applicable layers.

In another example, this disclosure describes a computer-readable data storage medium having instructions stored thereon that, when executed, configure a video encoding device to: include, in a video data bitstream, a VPS extension for a video coding extension, the VPS extension being a syntax structure within a VPS, the VPS being a syntax structure that is applicable to one or more entire coded video sequences, the VPS extension including a syntax element that indicates whether a coding tool associated with the video coding extension is enabled for a set of applicable layers; when the syntax element indicates that the coding tool is enabled for the set of applicable layers, encode, with use of the coding tool, at least a portion of video data that is associated with the one or more entire coded video sequences and that is associated with the set of applicable layers; and when the syntax element indicates that the coding tool is not enabled for the set of applicable layers, encode, without use of the coding tool, the video data that is associated with the one or more entire coded video sequences and that is associated with the set of applicable layers.

The details of one or more examples of the disclosure are set forth in the accompanying drawings and the description below. Other features, objects, and advantages will be apparent from the description, drawings, and claims.

DETAILED DESCRIPTION

Figure 1:
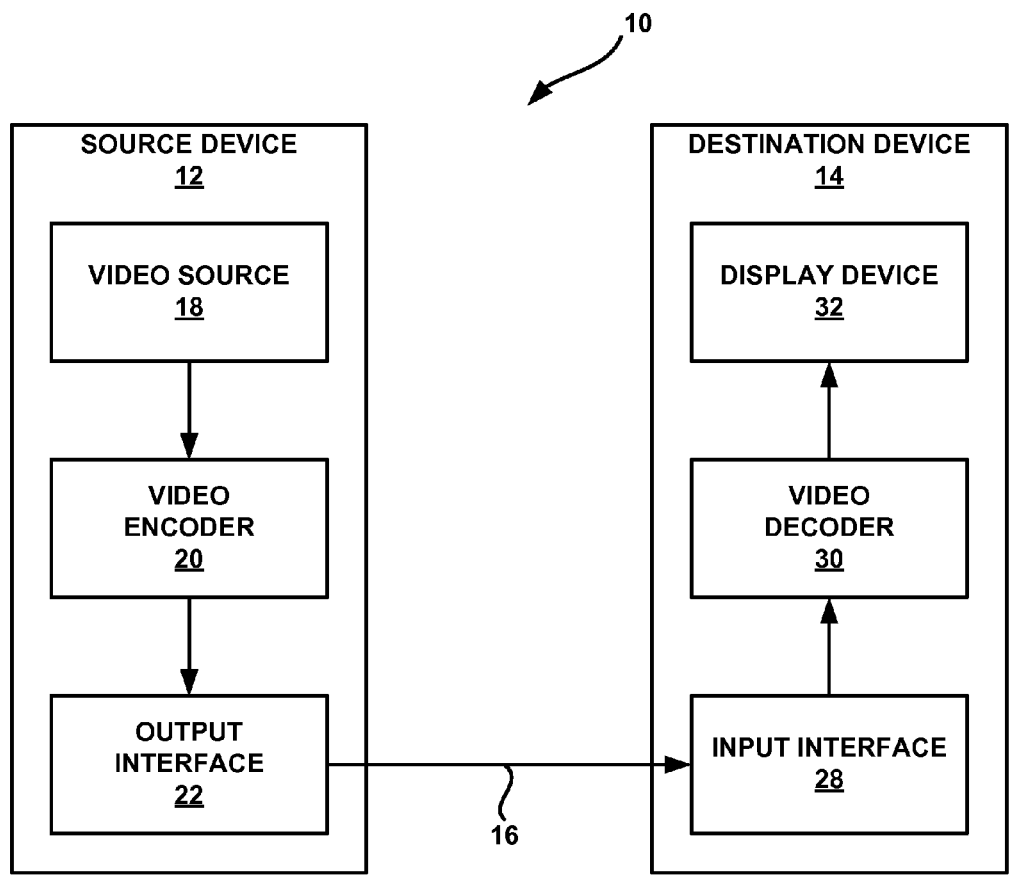
FIG. 1 is a block diagram illustrating an example video coding system that may utilize the techniques described in this disclosure.

High-Efficiency Video Coding (HEVC) is a video coding specification that is presently under development. There are efforts underway to generate a multi-view coding extension to HEVC, referred to as MV-HEVC, and a 3-dimensional video (3DV) extension to HEVC, referred to as 3D-HEVC. In addition, there are efforts underway to generate a scalable video coding (SVC) extension to HEVC, referred to as SHEVC.

In MV-HEVC, 3D-HEVC and SHEVC, a video encoder may generate a bitstream that comprises a series of network abstraction layer (NAL) units. Different NAL units of the bitstream may be associated with different layers of the bitstream. A layer may be defined as a set of video coding layer (VCL) NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In 3D video coding, a layer may contain either all coded depth pictures of a specific view or coded texture pictures of a specific view. Similarly, in the context of scalable video coding, a layer typically corresponds to coded pictures having video characteristics different from coded pictures in other layers. Such video characteristics typically include spatial resolution and quality level (Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. NAL units only encapsulate data of a single layer. Thus, NAL units encapsulating data of the highest remaining layer of the bitstream may be removed from the bitstream without affecting the decodability of data in the remaining layers of the bitstream. In multi-view coding and 3D-HEVC, higher layers may include additional view components. In SHEVC, higher layers may include signal to noise ratio (SNR) enhancement data, spatial enhancement data, and/or temporal enhancement data. In 3D-HEVC and SHEVC, a view may be referred to as a "base layer" if a video decoder can decode pictures in the view without reference to data of any other layer. The base layer may conform to the HEVC base specification.

In 3D-HEVC and SHEVC, various coding tools are available to provide further data compression. However, there are several reasons why the use of such coding tools is not desirable. For example, the use of such coding tools may increase the amount of time required to decode the video data. In another example, video decoders that are capable of using such coding tools may be significantly more complex than video decoders that are not capable of using such coding tools. Accordingly, 3D-HEVC and SHEVC provide mechanisms for selectively indicating that such coding tools are enabled or disabled.

In HEVC and its extensions, a video encoder may generate a bitstream that includes one or more video parameter sets (VPSs). A VPS is a syntax structure that includes syntax elements whose values are applicable to zero or more entire coded video sequences. A coded video sequence may include a sequence of access units that consists, in decoding order, of a clean random access (CRA) access unit that is the first access unit in the bitstream, an instantaneous decoding refresh (IDR) access unit, or a broken link access (BLA) access unit, followed by zero or more non-IDR and non-BLA access units including all subsequent access units up to but not including any subsequent IDR or BLA access units. An access unit may be a set of NAL units that are consecutive in decoding order and contain coded pictures occurring at one time instance.

Furthermore, in HEVC and its extensions, a video encoder may include one or more sequence parameter sets (SPSs). A SPS is a syntax structure that includes syntax elements whose values are applicable to zero or more entire coded video sequences. A SPS may include a syntax element (e.g., video_parameter_set_id) that identifies a VPS applicable to the SPS. A single VPS may be associated with multiple SPSs. The SPSs associated with a single VPS may include syntax elements having different values. Thus, a VPS may to applicable to a first set of one or more coded video sequences and a SPS that includes a syntax element that identifies the VPS may be a syntax structure that is applicable to a second set of zero or more coded video sequences. Thus, a video encoder may generate fewer VPSs than SPSs. Each SPS may include a syntax element that identifies the SPS as being associated with a particular VPS. Furthermore, the bitstream may include picture parameter sets (PPSs). Each PPS is a syntax structure that includes syntax elements whose values are applicable to zero or more entire coded pictures. Each PPS may include a syntax element that identifies the PPS as being associated with a particular SPS.

Different HEVC extensions (e.g., 3D-HEVC, SHEVC, etc.) are associated with different SPS extensions that include syntax elements specific to the HEVC extensions. For example, when a bitstream is generated using 3D-HEVC, the SPS may include a SPS extension that includes one or more syntax elements specific to 3D-HEVC. In this example, the SPS extension may include an interview refs_present_flag that indicates whether inter-view references can be used, an enable_dmm_flag that indicates whether depth map modeling modes are enabled, a use_mvi_flag that indicates whether motion vector inheritance from texture to depth is enabled, a multi_view_mv_pred_flag that indicates whether inter-view motion vector prediction is enabled, and a multi_view_residual_pred_flag that indicates whether inter-view residual prediction is enabled.

There are several problems with the scheme described above. As mentioned above, the base layer of a bitstream conforms to the base HEVC specification. Hence, a SPS applicable to the base layer does not include a SPS extension for an HEVC extension (e.g., 3D-HEVC, SHEVC, etc.). When the bitstream conforms to an HEVC extension and includes one or more layers in addition to the base layer, different coding tools of the HEVC extension may be enabled for different layers. Hence, the video encoder may need to generate multiple SPSs, each of which is applicable to a different layer of the same coded video sequence. However, each of the SPSs may include syntax elements that are associated with the base HEVC specification and not associated with the HEVC extension. Hence, the syntax elements associated with the base HEVC specification may be repeated in each of the SPSs applicable to the layers of the same coded video sequence. This may unnecessarily increase the size of the bitstream. Furthermore, because each PPS is associated with only a single SPS, the bitstream may need to include one or more PPSs for each layer. Because the PPSs do not include syntax elements specific to the HEVC extension, the PPSs may be copies of one another, aside from the syntax elements indicating the associated SPSs. Thus, the additional SPSs may amount to a waste of bits.

In accordance with one or more techniques of this disclosure, a video encoder may include, in a video data bitstream, a VPS extension for a video coding extension. The VPS extension may be a syntax structure within a VPS. The VPS itself may be a syntax structure that is applicable to one or more entire coded video sequences. The VPS extension may include a syntax element that indicates whether a coding tool associated with the video coding extension is enabled for a set of applicable layers. When the syntax element indicates that the coding tool is enabled for the set of applicable layers, the video encoder may encode, with use of the coding tool, at least a portion of video data that is associated with the one or more entire coded video sequences and that is associated with the set of applicable layers. When the syntax element indicates that the coding tool is not enabled for the set of applicable layers, the video encoder may encode, without use of the coding tool, the video data that is associated with the one or more coded video sequences and that is associated with the set of applicable layers. The coding tools may include one or more of: use of inter-view references, use of depth map modeling modes, use of motion vector inheritance from texture to depth, use of inter-view motion vector prediction, and use of inter-view residual prediction.

In one example, a video encoder may generate a bitstream that includes data representing a VPS that includes a VPS extension for an HEVC extension. The VPS extension may include, for each layer of the bitstream, syntax elements that indicate whether particular coding tools associated with the HEVC extension are enabled for decoding video data that are associated with the layer and associated with coded video sequences applicable to the VPS. These syntax elements are not signaled in SPS extensions for the layers.

Similarly, a video decoder may obtain, from a video data bitstream, a VPS extension for a video coding extension. The VPS extension may include a syntax element that indicates whether a coding tool associated with the video coding extension is enabled for a set of applicable layers. When the syntax element indicates that the coding tool is enabled for the one or applicable layers, the video decoder may decode, with use of the coding tool, at least a portion of video data that is associated with the one or more entire coded video sequences and that is associated with the set of applicable layers. When the syntax element indicates that the coding tool is not enabled for the set of applicable layers, the video decoder may decode, without use of the coding tool, the video data that is associated with the one or more coded video sequences and that is associated with the set of applicable layers.

In one example, the VPS extension may include respective syntax elements for each respective layer of the video data bitstream. Furthermore, for each respective layer of the video data bitstream, when the syntax element for the respective layer indicates that a coding tool is enabled for the respective layer, the video decoder may decode, with use of the coding tool, at least a portion of video data that is associated with the coded video sequence and that is associated with the respective layer. When the syntax element for the respective layer indicates that the coding tool is not enabled for the respective layer, the video decoder may decode, without use of the coding tool, the video data that is associated with the coded video sequence and that is associated with the respective layer.

Because syntax elements that indicate whether coding tools are enabled for particular layers are signaled in a VPS extension instead of extensions to SPSs, it may not be necessary for the bitstream to include the SPSs for each of the layers. Hence, the bitstream may be smaller by at least the number of bits needed to represent the base HEVC specification syntax elements of the SPSs. Furthermore, because the syntax elements are signaled in a VPS extension instead of extensions to SPSs, it may not be necessary to generate as many PPSs, further saving bits.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. In general, encoding video data refers to generating an encoded representation of the video data. Accordingly, source device 12 may be referred to as a video encoding device or a video encoding apparatus. Destination device 14 may decode the encoded video data generated by source device 12. In general, decoding encoded video data refers to determining pixel sample values based on the encoded video data. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet).

The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based 3DV extension. In some instances, any legal bitstream conforming to MVC-based 3DV always contains a sub-bitstream that is compliant to a MVC profile, e.g., stereo high profile. Annex H of the H.264/AVC standard describes the MVC extension of H.264/AVC. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual.

In the example of FIG. 1, video encoder 20 and video decoder 30 may operate according to the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A draft of the upcoming HEVC standard, referred to as "HEVC Working Draft 7" is described in Bross et al., "High Efficiency Video Coding (HEVC) text specification draft 7," Joint Collaborative Team on Video Coding (JCT-VC) of ITU-T SG16 WP3 and ISO/IEC JTC1/SC29/WG11, 9$^{th}$ Meeting, Geneva, Switzerland, May 2012. Another draft of the upcoming HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 10$^{th}$ Meeting, Stockholm, Sweden, July 2012.

Furthermore, there are ongoing efforts to produce SVC, multi-view coding, and 3DV extensions for HEVC. The SVC extension of HEVC may be referred to as HEVC-SVC or SHEVC. The multi-view coding extension of HEVC may be referred to as MV-HEVC. The 3DV extension of HEVC may be referred to as HEVC-based 3DV or 3D-HEVC. 3D-HEVC is based, at least in part, on solutions proposed in Schwarz et al., "Description of 3D Video Coding Technology Proposal by Fraunhofer HHI (HEVC compatible configuration A)", ISO/IEC JTC1/SC29/WG11, Doc. MPEG11/M22570, Geneva, Switzerland, Nov./Dec. 2011, hereinafter "m22570" and Schwarz et al., "Description of 3D Video Coding Technology Proposal by Fraunhofer HHI (HEVC compatible configuration B)", ISO/IEC JTC1/SC29/WG11, Doc. MPEG11/M22571, Geneva, Switzerland, Nov./Dec. 2011, hereinafter "m22571." A reference software description for 3D-HEVC is available at Schwarz et al, "Test Model under Consideration for HEVC based 3D video coding," ISO/IEC JTC1/SC29/WG11MPEG2011/N12559, San Jose, USA, Feb. 2012. Reference software, namely HTM version 3.0 is available, as of Jul. 18, 2013, from https://hevc.hhi.fraunhofer.de/svn/svn_3DVCSoftware/tags/HTM-3.0/.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture comprising three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs), macroblocks, macroblock partitions, and so on.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture comprising three separate color planes, a CU may comprise a single coding block and syntax structures used to code the samples of the coding block. Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. Video encoder 20 may generate predictive luma, Cb and Cr blocks for luma, Cb, and Cr prediction blocks of each PU of the CU. In a monochrome picture or a picture comprising three separate color planes, a PU may comprise a single prediction block and syntax structures used to code the samples of the prediction block.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In a monochrome picture or a picture comprising three separate color planes, a TU may comprise a single transform block and syntax structures used to code the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. An RBSP for a coded slice may include a slice header and slice data.

Video decoder 30 may receive a bitstream. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

The headers of NAL units in the bitstream may include nuh_reserved_zero 6 bits syntax elements. The nuh_reserved_zero_6 bits syntax element of a NAL unit is equal to 0 if the NAL unit relates to a base layer in multi-view coding, 3DV coding, or scalable video coding. Data in a base layer of a bitstream may be decoded without reference to data in any other layer of the bitstream. If the NAL unit does not relate to a base layer in multi-view coding, 3DV, or scalable video coding, the nuh_reserved_zero 6 bits syntax element may have other non-zero values. Specifically, if a NAL unit does not relate to a base layer in multi-view coding, 3DV, or scalable video coding, the nuh_reserved_zero_6 bits syntax element of the NAL unit may specify a layer identifier.

Furthermore, some pictures within a layer may be decoded without reference to other pictures within the same layer. Thus, NAL units encapsulating data of certain pictures of a layer may be removed from the bitstream without affecting the decodability of other pictures in the layer. For example, pictures with even picture order count (POC) values may be decodable without reference to pictures with odd POC values. A POC is a variable associated with a coded picture and has a value that is increasing with increasing picture position in output order relative to the previous IDR picture in decoding order, if any. Removing NAL units encapsulating data of such pictures may reduce the frame rate of the bitstream. A subset of pictures within a layer that may be decoded without reference to other pictures within the layer may be referred to herein as a sub-layer.

NAL units may include nuh_temporal_id_plus 1 syntax elements. The nuh_temporal_id_plus1 syntax element of a NAL unit may specify a temporal identifier (i.e., a temporal_id) of the NAL unit. If the temporal identifier of a first NAL unit is less than the temporal identifier of a second NAL unit, the data encapsulated by the first NAL unit may be decoded without reference to the data encapsulated by the second NAL unit.

Operation points of a bitstream are each associated with a set of layer identifiers (i.e., a set of nuh_reserved_zero_6 bits values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. An operation point representation is a bitstream subset (i.e., a sub-bitstream) that is associated with an operation point. The operation point representation of an operation point may include each NAL unit that is associated with the operation point. The operation point representation does not include VCL NAL units that are not associated with the operation point.

An external source or device may specify a set of target layer identifiers for an operation point. For example, an intermediate network device, such as a media-aware network element (MANE) or a content delivery network (CDN) device, may specify the set of target layer identifiers. In this example, the intermediate network device may use the set of target layer identifiers to identify an operation point. The intermediate network device may then extract the operation point representation for the operation point and forward the operation point representation, instead of the original bitstream, to a client device. Extracting and forwarding the operation point representation to the client device may reduce the bit rate of the bitstream.

Video coding standards specify video buffering models. In H.264/AVC and HEVC, a buffering model is referred to as a "hypothetical reference decoder" or "HRD." In HEVC Working Draft 8, the HRD is described in Annex C.

The HRD describes how data is to be buffered for decoding and how decoded data is buffered for output. For instance, the HRD describes the operation of a coded picture buffer (CPB), a decoded picture buffer ("DPB"), and a video decoding process. The CPB is a first-in first-out buffer containing access units in a decoding order specified by the HRD. The DPB is a buffer holding decoded pictures for reference, output reordering, or output delay specified by the HRD. The behaviors of the CPB and DPB may be mathematically specified. The HRD may directly impose constraints on timing, buffer sizes, and bit rates. Furthermore, the HRD may indirectly impose constraints on various bitstream characteristics and statistics.

In H.264/AVC and HEVC, bitstream conformance and decoder conformance are specified as parts of the HRD specification. In other words, the HRD model specifies tests to determine whether a bitstream conforms to a standard and specifies tests to determine whether a decoder conforms to the standard. Though the HRD is named as some kind of decoder, video encoders typically use the HRD to guarantee bitstream conformance, while video decoders typically do not need the HRD.

H.264/AVC and HEVC both specify two types of bitstream or HRD conformance, namely Type I and Type II. A Type I bitstream is a NAL unit stream containing only the VCL NAL units and filler data NAL unit for all access units in the bitstream. A Type II bitstream is a NAL unit stream that contains, in addition to the VCL NAL units and filler data NAL units for all access units in the bitstream, at least one of the following: additional non-VCL NAL units other than filler data NAL units; and all leading_zero_8 bits, zero_byte, start_coded_prefix_one_3 bytes, and trailing_zero_8 bits syntax elements that form a byte stream from the NAL unit stream.

When a device performs a bitstream conformance test that determines whether a bitstream conforms to a video coding standard, the device may select an operation point of the bitstream. The device may then determine a set of HRD parameters applicable to the selected operation point. The device may use the set of HRD parameters applicable to the selected operation point to configure the behavior of the HRD. More particularly, the device may use the applicable set of HRD parameters to configure the behaviors of particular components of the HRD, such as a hypothetical stream scheduler (HSS), the CPB, a decoding process, the DPB, and so on. Subsequently, the HSS may inject coded video data of the bitstream into the CPB of the HRD according to a particular schedule. Furthermore, the device may invoke a decoding process that decodes the coded video data in the CPB. The decoding process may output decoded pictures to the DPB. As the device moves data through the HRD, the device may determine whether a particular set of constraints remains satisfied. For example, the device may determine whether an overflow or underflow condition occurs in the CPB or DPB while the HRD is decoding the operation point representation of the selected operation point. The device may select and process each operation point of the bitstream in this manner. If no operation point of the bitstream causes the constraints to be violated, the device may determine that the bitstream conforms to the video coding standard.

Both H.264/AVC and HEVC specify two types of decoder conformance, namely output timing decoder conformance and output order decoder conformance. A decoder claiming conformance to a specific profile, tier and level is able to successfully decode all bitstreams that conform to the bitstream conformance requirements of a video coding standard, such as HEVC. In this disclosure, a "profile" may refer to a subset of the bitstream syntax. "Tiers" and "levels" may be specified within each profile. A level of a tier may be a specified set of constraints imposed on values of the syntax elements in the bitstream. These constraints may be simple limits on values. Alternatively, the constraints may take the form of constraints on arithmetic combinations of values (e.g., picture width multiplied by picture height multiplied by number of pictures decoded per second). Typically, a level specified for a lower tier is more constrained than a level specified for a higher tier.

When a device performs a decoder conformance test to determine whether a decoder under test (DUT) conforms to a video coding standard, the device may provide, to both the HRD and the DUT, a bitstream that conforms to the video coding standard. The HRD may process the bitstream in the manner described above with regard to the bitstream conformance test. The device may determine that the DUT conforms to the video coding standard if the order of decoded pictures output by the DUT matches the order of decoded pictures output by the HRD. Moreover, the device may determine that the DUT conforms to the video coding standard if the timing with which the DUT outputs decoded pictures matches the timing with which the HRD outputs the decoded pictures.

In the H.264/AVC and HEVC HRD models, decoding or CPB removal may be access unit based. That is, the HRD is assumed to decode complete access units at one time and remove complete access units from the CPB. Furthermore, in the H.264/AVC and HEVC HRD models, it is assumed that picture decoding is instantaneous. Video encoder 20 may signal, in picture timing SEI messages, decoding times to start decoding of access units. In practical applications, if a conforming video decoder strictly follows the decoding times signaled to start decoding of access units, the earliest possible time to output a particular decoded picture is equal to the decoding time of that particular picture plus the time needed for decoding that particular picture. However, in the real-world, the time needed for decoding a picture cannot be equal to zero.

HRD parameters may control various aspects of the HRD. In other words, the HRD may rely on the HRD parameters. The HRD parameters may include an initial CPB removal delay, a CPB size, a bit rate, an initial DPB output delay, and a DPB size. Video encoder 20 may signal these HRD parameters in a hrd_parameters( ) syntax structure specified in a video parameter set (VPS) and/or a sequence parameter set (SPS). Individual VPS's and/or SPS's may include multiple hrd_parameters( ) syntax structures for different sets of HRD parameters. In some examples, video encoder 20 may signal HRD parameters in buffering period SEI messages or picture timing SEI messages.

When a video coder (e.g., video encoder 20 or video decoder 30) begins coding a current slice of a picture, the video coder may initialize a first reference picture list (i.e., List 0). Furthermore, if the current slice is a B slice, the video coder may initialize a second reference picture list (i.e., List 1). This disclosure may refer to List 0 as "RefPicList0" and may refer to List 1 as "RefPicList1." After a video coder has initialized a reference picture list (e.g., List 0 or List 1), the video coder may modify the order of the reference pictures in the reference picture list. In other words, the video coder may perform a reference picture list modification (RPLM) process. The video coder may modify the order of the reference pictures in any order, including the case where one particular reference picture may appear in more than one position in the reference picture list.

In some cases, video encoder 20 may signal the motion information of a PU using merge mode or advanced motion vector prediction (AMVP) mode. In other words, in HEVC, there are two modes for the prediction of motion parameters, one being the merge mode and the other being AMVP. The motion information of a PU may include motion vector(s) of the PU and reference index(es) of the PU. When video encoder 20 signals the motion information of a current PU using merge mode, video encoder 20 generates a merge candidate list (i.e., a motion vector predictor (MVP) candidate list). In other words, video encoder 20 may perform a motion vector predictor list construction process. The merge candidate list includes a set of merge candidates (i.e., MVP candidates). The merge candidate list may include merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index into the candidate list. Video decoder 30 may obtain, from the bitstream, the index into the candidate list (i.e., a candidate list index). In addition, video decoder 30 may generate the same merge candidate list and may determine, based on the indication of the position of the selected merge candidate, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points are to be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may use, as a predictive block for the PU, a reference block indicated by the motion information of a selected candidate in the merge candidate list.

AMVP mode is similar to merge mode in that video encoder 20 generates a candidate list and selects a candidate from the list of candidates. However, when video encoder 20 signals the motion information of a current PU using AMVP mode, video encoder 20 may signal a motion vector difference (MVD) for the current PU and a reference index, in addition to signaling a position of the selected candidate in the candidate list. An MVD for the current PU may indicate a difference between a motion vector of the current PU and a motion vector of the selected candidate from the AMVP candidate list. In uni-prediction, video encoder 20 may signal one MVD and one reference index for the current PU. In bi-prediction, video encoder 20 may signal two MVDs and two reference indexes for the current PU. In this way, video encoder 20 may signal the selected motion vectors by transmitting an index into the candidate list and may signal the reference index values and MVDs. In other words, the data in the bitstream representing the motion vector for the current PU may include data representing a reference index, an index to a candidate list, and an MVD.

Furthermore, when the motion information of a current PU is signaled using AMVP mode, video decoder 30 may obtain, from the bitstream, a MVD for a current PU and a candidate list index. Video decoder 30 may generate the same AMVP candidate list and may determine, based on the indication of the position of the selected candidate in the AMVP candidate list, the selected candidate. Video decoder 30 may recover a motion vector of the current PU by adding a MVD to the motion vector indicated by the selected candidate. That is, video decoder 30 may determine, based at least in part on a motion vector indicated by the selected candidate and the MVD, the motion vector of the current PU. Video decoder 30 may then use the recovered motion vector or motion vectors of the current PU to generate predictive blocks for the current PU.

Figure 2:
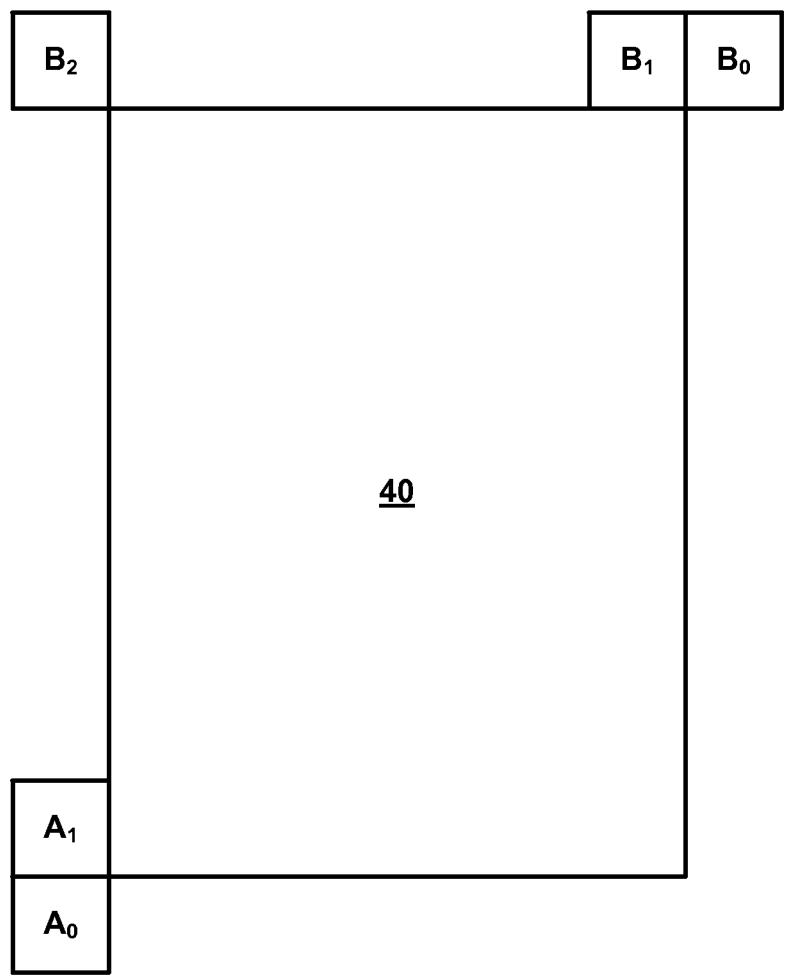
FIG. 2 is a conceptual diagram illustrating example spatial motion vector neighbors relative to a current prediction unit.

As indicated above, candidate lists for merge mode or AMVP may include candidates based on PUs that spatially neighbor a current PU. This disclosure may refer to such PUs as spatially-neighboring PUs or spatial motion vector neighbors. FIG. 2 is a conceptual diagram illustrating example spatial motion vector neighbors relative to a current PU 40. That is, an example relationship between PU 40 and spatially-neighboring PUs of PU 40 is depicted in FIG. 2. In the example of FIG. 2, the spatially-neighboring PUs may be PUs that cover the locations indicated as $A_0, A_1, B_0, B_1$, and $B_2$. A PU may cover a location when a prediction block of the PU includes the location.

With regard to the example of FIG. 2, a luma location (xP, yP) may specify the top-left luma sample of PU 40 relative to a top-left luma sample of the current picture. Furthermore, the variables nPSW and nPSH may respectively denote the width and height, in luma samples, of PU 40. The top-left luma sample of a PU N relative to the top-left sample of the current picture is (xN, yN), where N denotes a PU covering positions $A_0, A_1, B_0, B_1$, or $B_2$. For PUs covering positions $A_0, A_1, B_0, B_1$, or $B_2$, (xN, yN) may be defined as (xP−1, yP+nPSH), (xP−1, yP+nPSH−1), (xP+nPSW, yP−1), (xP+nPSW−1, yP−1) or (xP−1, yP−1), respectively.

A candidate in a merge candidate list or an AMVP candidate list that is based on the motion information of a PU that temporally neighbors a current PU (i.e., a PU that is in a different time instance than the current PU) may be referred to as a temporal motion vector predictor (TMVP). To determine a TMVP, a video coder may firstly identify a reference picture that includes a PU that is co-located with the current PU. In other words, the video coder may identify a co-located picture. If the current slice of the current picture is a B slice (i.e., a slice that is allowed to include bi-directionally inter predicted PUs), video encoder 20 may signal, in a slice header, a syntax element (e.g., collocated_from_10_flag) that indicates whether the co-located picture is from RefPicList0 or RefPicList1. After video decoder 30 identifies the reference picture list that includes the co-located picture, video decoder 30 may use another syntax element (e.g., collocated_ref_idx), which may be signaled in a slice header, to identify a picture (i.e., the co-located picture) in the identified reference picture list.

A video coder may identify a co-located PU by checking the co-located picture. The TMVP may indicate either the motion information of a right-bottom PU of the CU containing the co-located PU, or the motion information of the right-bottom PU within the center PUs of the CU containing this PU. The right-bottom PU of the CU containing the co-located PU may be a PU that covers a location immediately below and right of a bottom-right sample of a prediction block of the PU. In other words, the TMVP may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU.

When motion vectors identified by the above process are used to generate a motion candidate for merge mode or AMVP mode, the motion vectors may be scaled based on the temporal location (reflected by POC value) of the reference picture. For instance, a video coder may increase the magnitude of a motion vector by greater amounts when a difference between the POC values of a current picture and a reference picture is greater than when a difference between the POC values of the current picture and the reference picture is less.

In multi-view coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

Figure 3:
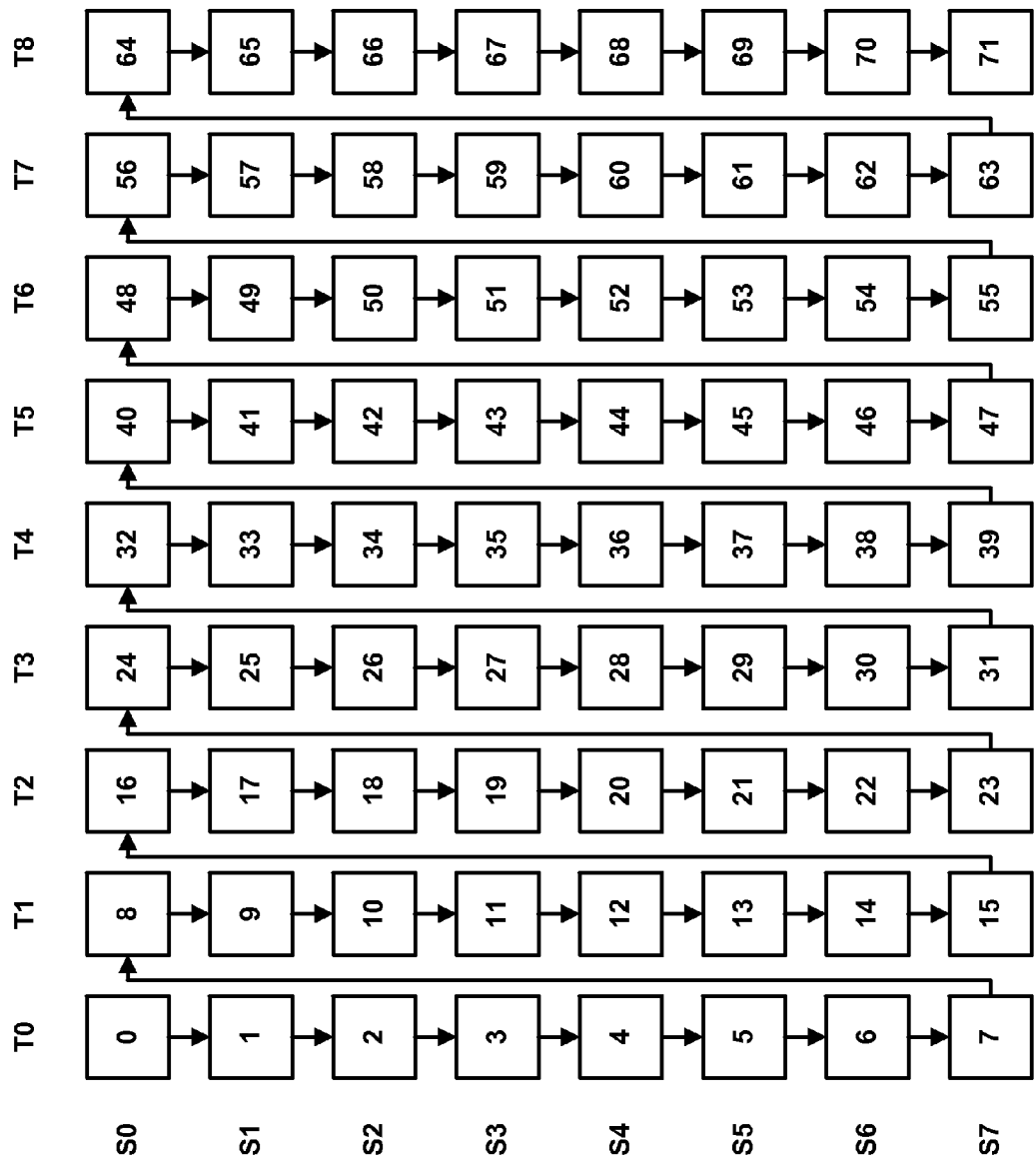
FIG. 3 is a conceptual diagram illustrating an example multi-view decoding order.

FIG. 3 is a conceptual diagram illustrating an example multi-view decoding order. The multi-view decoding order may be a bitstream order. In the example of FIG. 3, each square corresponds to a view component. Columns of squares correspond to access units. Each access unit may be defined to contain the coded pictures of all the views of a time instance. Rows of squares correspond to views. In the example of FIG. 3, the access units are labeled T0 ... T8 and the views are labeled S0 ... S7. Because each view component of an access unit is decoded before any view component of the next access unit, the decoding order of FIG. 3 may be referred to as time-first coding. The decoding order of access units may not be identical to the output or display order of the views.

Multi-view coding supports inter-view prediction. Inter-view prediction is similar to the inter prediction used in H.264/AVC, HEVC, or other video coding standards and may use the same syntax elements. However, when a video coder performs inter-view prediction on a current video unit (such as a macroblock or PU), the video coder may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list (e.g., RefPicList0 or RefPicList1) if the picture is in a different view but within a same time instance (i.e. access unit) as the picture that the video coder is currently coding. Like other inter prediction reference pictures, the video coder may insert an inter-view prediction reference picture at any position of a reference picture list.

Figure 4:
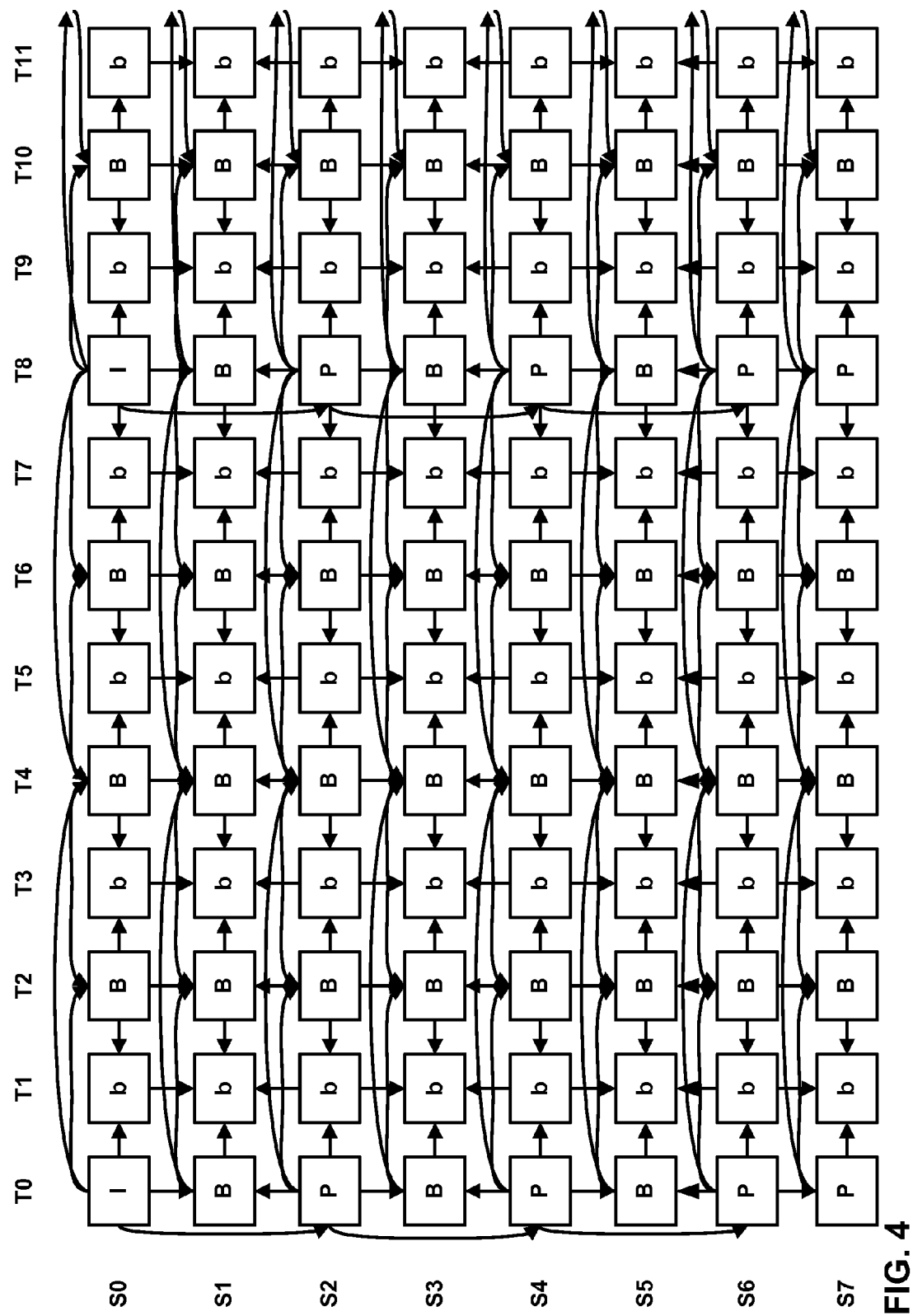
FIG. 4 is a conceptual diagram illustrating an example prediction structure for multi-view coding.

FIG. 4 is a conceptual diagram illustrating an example prediction structure for multi-view coding. The multi-view prediction structure of FIG. 4 includes temporal and inter-view prediction. In the example of FIG. 4, each square corresponds to a view component. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 4, view components in different views of the same access unit may be available as reference pictures. The use of one view component of an access unit as a reference picture for another view component of the same access unit may be referred to as inter-view prediction.

In the MVC extension of H.264/AVC, inter-view prediction is supported by disparity motion compensation, which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multi-view representation. Consequently, any renderer with a MVC decoder may expect 3D video content with more than two views.

In the MVC extension of H.264/AVC, inter-view prediction is allowed among pictures in the same access unit (i.e., with the same time instance). When coding a picture in one of the non-base views, a picture may be added into a reference picture list if the picture is in a different view but with a same time instance. An inter-view prediction reference picture can be put in any position of a reference picture list, just like any inter prediction reference picture.

3D-HEVC provides for multiple views of the same scene from different viewpoints. Part of the standardization efforts for 3D-HEVC includes the standardization of the multi-view video codec based on HEVC. Similarly, in HEVC based 3DV, inter-view prediction based on the reconstructed view components from different views is enabled. Like MVC in H.264/AVC, 3D-HEVC supports inter-view motion prediction. In 3D-HEVC, inter-view prediction is similar to the motion compensation used in standard HEVC and may utilize the same or similar syntax elements. However, when a video coder performs inter-view motion prediction on a PU, the video coder may use, as a reference picture, a picture that is in the same access unit as the PU, but in a different view. In contrast, conventional motion compensation only uses pictures in different access units as reference pictures. Thus, in 3D-HEVC, the motion parameters of a block in a dependent view are predicted or inferred based on already coded motion parameters in other views of the same access unit.

A video coder may generate a candidate list (e.g., a merge candidate list or an AMVP candidate list) when the motion information of a current PU is signaled using merge mode or AMVP mode. In 3D-HEVC, the candidate list may include an inter-view prediction candidate that may be used in the same manner as other candidates in the candidate list. The inter-view prediction candidate specifies the motion information of a PU (i.e., a reference PU) of a reference picture. The reference picture may be in the same access unit as the current PU, but is in a different view than the current PU. To determine the reference PU, the video coder may perform a disparity vector construction process to determine a disparity vector for the current PU. The disparity vector for the current PU may indicate a horizontal spatial displacement between the current PU and a location within the reference texture picture. The reference PU may be the PU of the reference texture picture that covers the location indicated by the disparity vector.

Furthermore, video encoder 20 may generate VPSs, SPSs, and PPSs. A VPS is a syntax structure that includes syntax elements whose values are applicable to zero or more entire coded video sequences. A SPS is a syntax structure that includes syntax elements whose values are applicable to zero or more entire coded video sequences. A single VPS may be associated with multiple SPSs. The SPSs associated with a single VPS may include syntax elements having different values. Thus, video encoder 20 may generate fewer VPSs than SPSs. Each SPS may include a syntax element that identifies the SPS as being associated with a particular VPS. Each PPS is a syntax structure that includes syntax elements whose values are applicable to zero or more entire coded pictures. Each PPS may include a syntax element that identifies the PPS as being associated with a particular SPS.

In HEVC, the VPS, SPS, PPS mechanism decouples the transmission of infrequently changing information from the transmission of coded block data. In some applications, VPSs, SPSs, and PPSs may be conveyed out-of-band. That is, in some instances, VPSs, SPSs and PPSs are not transported together with units containing coded video data. Out-of-band transmission may typically be reliable.

Each VPS, SPS, PPS, and adaptation parameter set (APS) may include an identifier. In HEVC Working Draft 7, the identifier of a VPS, SPS, PPS, or APS is coded using "ue(v)." In other words, the identifier of a VPS, a SPS, a PPS, or an APS is coded using variable-length unsigned integers encoded using $0^{th}$ order exponential Golomb (Exp-Golomb) coding with left bit first. Each SPS includes an SPS identifier and a VPS identifier, each PPS includes a PPS identifier and an SPS identifier. Each slice header includes a PPS identifier (and, in some versions of HEVC, possibly an APS identifier).

A VPS may contain mainly profile/level and HRD information for 2-dimensional video. Furthermore, a VPS may include one or more extensions (i.e., VPS extensions) that contain syntax elements associated with extensions to HEVC (e.g., 3D-HEVC, SHEVC, etc.). 3D-HEVC VPS extensions and SHEVC VPS extensions may include information related to one or more operation points. In addition, a VPS may include information requested for session negotiation, such as bit rates.

Typically, sequence level information parameters are present in an SPS. For instance, an SPS includes syntax elements (e.g., flags) that enable or disable coding tools defined in the HEVC base specification. A coding tool may be a process or technique for coding video data. Like VPSs, SPSs may include one or more extensions (i.e., SPS extensions) that contain syntax elements associated with extensions to HEVC (e.g., 3D-HEVC, SHEVC, etc.). An SPS extension may include syntax elements that indicate whether coding tools defined in an HEVC extension are enabled or disabled. In 3D-HEVC, several such syntax elements are included in a SPS extension.

The syntax elements that indicate whether particular coding tools are enabled may include interview_refs_present_flag, enable_dmm_flag, use_mvi_flag, multi_view_m-v_pred_flag, and multi_view_residual_pred_flag. The inter-view_refs_present_flag syntax element indicates whether inter-view references can be used. When inter-view references are used, a video coder may generate, based at least in part on a reference picture in a different view than a current picture, a predictive block for a PU of the current picture. The enable_dmm_flag syntax element indicates whether depth map modeling (DMM) modes are enabled. DMM modes belong to partition-based depth intra coding, and are designed to better represent the depth information. Such partition-based depth intra coding modes include Depth Modeling Modes (DMM). In DMM modes, a depth block is coded with two non-rectangle partitions. The DC value for each partition is predicted using neighboring reference samples and a residual value may be further coded to compensate the prediction error. The DC value of a partition may be a top-left value of the partition.

The use_mvi_flag syntax element indicates whether motion vector inheritance (MVI) from texture to depth is enabled. When motion vector inheritance from texture to depth is enabled, a video coder may determine, based at least in part on a motion vector of a PU in a texture view component, a motion vector of a corresponding PU in a corresponding depth view component.

The multi_view_mv_pred_flag syntax element indicates whether inter-view motion vector prediction is enabled. When inter-view motion vector prediction is enabled, a video coder may determine, based at least in part on a motion vector of a PU of a picture in a different view than a current picture, a motion vector of a PU of the current picture.

The multi_view_residual_pred_flag indicates whether inter-view residual prediction is enabled. When inter-view residual prediction is enabled, a video coder may determine, based at least in part on residual data of a CU of a reference picture in a different view than a current picture, residual data of a CU of the current picture.

As shown in the example of FIG. 4, a view component can use the view components of other views for reference. This may be referred to as inter-view prediction. In multi-view coding, inter-view prediction may be realized as if a view component in another view is an inter prediction reference picture. However, as shown below in Table 1, the potential inter-view reference pictures may be signaled in a SPS MVC extension. Furthermore, the potential inter-view reference pictures may be modified by the reference picture list construction process, which enables flexible ordering of the inter prediction or inter-view prediction references. Table 1, below, is an example syntax for a SPS MVC extension in AVC-based 3DV.

TABLE 1

SPS MVC Extension

| seq_parameter_set_mvc_extension( ) { | C | Descriptor |
|---|---|---|
| num_views_minus1 | 0 | ue(v) |
| for( i = 0; i <= num_views_minus1; i++ ) | | |
|   view_id[ i ] | 0 | ue(v) |
| for( i = 1; i <= num_views_minus1; i++ ) { | | |
|   num_anchor_refs_l0[ i ] | 0 | ue(v) |
|   for( j = 0; j < num_anchor_refs_l0[ i ]; j++ ) | | |
|     anchor_ref_l0[ i ][ j ] | 0 | ue(v) |
|   num_anchor_refs_l1[ i ] | 0 | ue(v) |
|   for( j = 0; j < num_anchor_refs_l1[ i ]; j++ ) | | |
|     anchor_ref_l1[ i ][ j ] | 0 | ue(v) |
| } | | |
| for( i = 1; i <= num_views_minus1; i++ ) { | | |
|   num_non_anchor_refs_l0[ i ] | 0 | ue(v) |
|   for( j = 0; j < num_non_anchor_refs_l0[ i ]; j++ ) | | |
|     non_anchor_ref_l0[ i ][ j ] | 0 | ue(v) |
|   num_non_anchor_refs_l1[ i ] | 0 | ue(v) |
|   for( j = 0; j < num_non_anchor_refs_l1[ i ]; j++ ) | | |
|     non_anchor_ref_l1[ i ][ j ] | 0 | ue(v) |
| } | | |
| num_level_values_signalled_minus1 | 0 | ue(v) |
| for( i = 0; i <= num_level_values_signalled_minus1; i++ ) { | | |
|   level_idc[ i ] | 0 | u(8) |
|   num_applicable_ops_minus1[ i ] | 0 | ue(v) |
|   for( j = 0; j <= num_applicable_ops_minus1[ i ]; j++ ) { | | |
|     applicable_op_temporal_id[ i ][ j ] | 0 | u(3) |
|     applicable_op_num_target_views_minus1[ i ][ j ] | 0 | ue(v) |
|     for( k = 0; k <= applicable_op_num_target_views_minus1[ i ][ j ]; k++ ) | | |
|       applicable_op_target_view_id[ i ][ j ][ k ] | 0 | ue(v) |
|     applicable_op_num_views_minus1[ i ][ j ] | 0 | ue(v) |
|   } | | |
| } | | |
| } | | |

In the example of Table 1, above, and other syntax tables of this disclosure, syntax elements with type descriptor ue(v) may be variable-length unsigned integers encoded using $0^{th}$ order exponential Golomb (Exp-Golomb) coding with left bit first. In the example of Table 1 and the following tables, syntax elements having descriptors of the form u(n), where n is a non-negative integer, are unsigned values of length n.

In the SPS MVC extension, for each view, the number of views that can be used to form reference picture list 0 and reference picture list 1 are signaled. For instance, anchor_ref_10[i][j] specifies a view identifier of the j-th view component for inter-view prediction in the initial reference picture list RefPicList0 in decoding anchor view components with view order index equal to i. A view order index indicates a position of a view in an ordering of views based on camera positions associated with the views. anchor_ref_11[i][j] specifies a view identifier of the j-th view component for inter-view prediction in the initial reference picture list RefPicList1 in decoding anchor view components with view order index equal to i. non_anchor_ref_10[i][j] specifies a view identifier of the j-th view component for inter-view prediction in the initial reference picture list RefPicList0 in decoding non-anchor view components with view order index equal to i. non_anchor_ref_11[i][j] specifies a view identifier of the j-th view component for inter-view prediction in the initial reference picture list RefPicList1 in decoding non-anchor view components with view order index equal to i.

As shown in Table 1, above, a prediction relationship for an anchor picture, as signaled in the SPS MVC extension can be different from the prediction relationship for a non-anchor picture (signaled in the SPS MVC extension) of the same view. An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order.

There are several problems with the scheme described above. As mentioned above, the base layer of a bitstream conforms to the base HEVC specification. Hence, a SPS applicable to the base layer does not include a SPS extension for an HEVC extension (e.g., 3D-HEVC, SHEVC, etc.). When the bitstream conforms to an HEVC extension and includes one or more layers in addition to the base layer, different coding tools of the HEVC extension may be enabled for different layers. Hence, video encoder 20 may need to generate multiple SPSs, each of which is applicable to a different layer of the same coded video sequence. However, each of the SPSs may include syntax elements that are associated with the base HEVC specification and not associated with the HEVC extension. Hence, the syntax elements associated with the base HEVC specification may be repeated in each of the SPSs applicable to the layers of the same coded video sequence. This may unnecessarily increase the size of the bitstream. Furthermore, because each PPS is associated with only a single SPS, the bitstream may need to include one or more PPSs for each layer. Because the PPSs do not include syntax elements specific to the HEVC extension, the PPSs may be copies of one another, aside from the syntax elements indicating the associated SPSs. Thus, the additional SPSs may amount to a waste of bits. In other words, the flags indicating additional tools in an HEVC extension (e.g., 3DV or scalable) may be present in a new SPS based on the current HEVC specification, since those flags will be in the SPS extension part. So even if all the other information of this SPS is the same as, e.g., the base layer/view SPS, a new SPS is needed, and consequently, a new PPS with the identical content but a different identifier is needed.

In accordance with one or more techniques of this disclosure, the VPS extension in HEVC extensions (e.g., multiview, 3DV, and SVC) can include tool-enabling flags. A tool-enabling flag may be a syntax element that indicates whether a particular coding tool is enabled. Thus, video encoder 20 does not need to include the tool-enabling flags in SPS extensions. That is, when new coding tools are introduced for an enhancement layer or view, flags enabling/disabling those tools may, as described above, be present in the VPS, either for a whole operation point or for a whole view/layer.

For instance, video encoder 20 may include, in a video data bitstream, a VPS extension for a video coding extension. The VPS extension may be a syntax structure within a VPS. The VPS itself may be a syntax structure that is applicable to one or more entire coded video sequences. The VPS extension may include a syntax element that indicates whether a coding tool associated with the video coding extension is enabled for a set of applicable layers. When the syntax element indicates that the coding tool is enabled for the set of applicable layers, video encoder 20 may encode, with use of the coding tool, at least a portion of video data that is associated with the one or more entire coded video sequences and that is associated with the set of applicable layers. When the syntax element indicates that the coding tool is not enabled for the set of applicable layers, video encoder 20 may encode, without use of the coding tool, the video data that is associated with the one or more coded video sequences and that is associated with the set of applicable layers.

Similarly, video decoder 30 may obtain, from a video data bitstream, a VPS extension for a video coding extension. The VPS extension may include a syntax element that indicates whether a coding tool associated with the video coding extension is enabled for a set of applicable layers. When the syntax element indicates that the coding tool is enabled for the one or applicable layers, video decoder 30 may decode, with use of the coding tool, at least a portion of video data that is associated with the one or more entire coded video sequences and that is associated with the set of applicable layers. When the syntax element indicates that the coding tool is not enabled for the set of applicable layers, video decoder 30 may decode, without use of the coding tool, the video data that is associated with the one or more coded video sequences and that is associated with the set of applicable layers.

In some examples, the tool-enabling flags may be present once in a VPS extension and thus be applicable for all layers of the bitstream. In some such examples, the set of applicable layers mentioned above may include (or may consist of) all layers of the video data bitstream excluding a base layer. In other such examples, the set of applicable layers mentioned above may include (or may consist of) all depth layers of the video data bitstream. In other examples, some tool-enabling flags may be present in a VPS extension once and may be applicable to all layers of the bitstream while other tool-enabling flags may be present in the VPS extension once for each layer of the bitstream. In addition, a SPS may include, in the VPS, syntax elements (e.g., flags) that indicate whether particular coding tools of the base HEVC specification are present for each layer.

In other examples, the tool-enabling flags may be present in a VPS extension once for each layer of the bitstream. In some such examples, the set of applicable layers mentioned above may include a single layer of the video data bitstream, but the syntax element may be among a plurality of syntax elements in the VPS extension. Each syntax element in the plurality of syntax elements indicates whether the coding tool is enabled for a single different layer from a plurality of layers. In some examples, the plurality of layers includes (or may consist of) each layer of the video data bitstream except a base view of the video data bitstream. In other examples, the plurality of layers includes (or may consist of) each depth layer of the video data bitstream.

Accordingly, in examples where the tool-enabling flags may be present in a VPS extension once for each layer of the bitstream, video encoder 20 may, for each respective syntax element in the plurality of syntax elements, when the respective syntax element indicates that the coding tool is enabled for a respective layer in the plurality of layers, encode, with use of the coding tool, at least a respective portion of video data that is associated with the one or more coded video sequences and that is associated with the respective layer. Furthermore, for each respective syntax element in the plurality of syntax elements, when the respective syntax element indicates that the coding tool is not enabled for the respective layer, video encoder 20 may encode, without use of the coding tool, the video data that is associated with the one or more coded video sequences and that is associated with the respective layer.

Likewise, for each respective syntax element in the plurality of syntax elements, when the respective syntax element indicates that the coding tool is enabled for a respective layer in the plurality of layers, video decoder 30 may decode, with use of the coding tool, at least a respective portion of video data that is associated with the one or more coded video sequences and that is associated with the respective layer. Furthermore, for each respective syntax element in the plurality of syntax elements, when the respective syntax element indicates that the coding tool is not enabled for the respective layer, video decoder 30 may decode, without use of the coding tool, the video data that is associated with the one or more coded video sequences and that is associated with the respective layer.

Otherwise stated, video encoder 20 may generate a video data bitstream that includes a VPS. The VPS includes a VPS extension for a video coding extension. The VPS extension includes respective syntax elements for each respective layer of the video data bitstream. The VPS extension is a syntax structure that is applicable to one or more entire coded video sequences. For each respective layer of the video data bitstream, when the syntax element for the respective layer indicates that a coding tool is enabled for the respective layer, video encoder 20 may encode, with use of the coding tool, at least a portion of video data that is associated with the one or more coded video sequences and that is associated with the respective layer. Encoding video data includes generating an encoded representation of the video data. Furthermore, for each respective layer of the video data bitstream, when the syntax element for the respective layer indicates that the coding tool is not enabled for the respective layer, video encoder 20 may encode, without use of the coding tool, the video data that is associated with the one or more coded video sequences and that is associated with the respective layer.

Similarly, video decoder 30 may obtain, from a video data bitstream, a VPS extension for a video coding extension. The VPS extension may include respective syntax elements for each respective layer of the video data bitstream. Furthermore, for each respective layer of the video data bitstream, when the syntax element for the respective layer indicates that a coding tool is enabled for the respective layer, the video decoder may decode, with use of the coding tool, at least a portion of video data that is associated with the coded video sequence and that is associated with the respective layer. Decoding video data includes generating decoded video data based on encoded video data. When the syntax element for the respective layer indicates that the coding tool is not enabled for the respective layer, video decoder 30 may decode, without use of the coding tool, the video data that is associated with the coded video sequence and that is associated with the respective layer.

Because the syntax elements are signaled in a VPS extension instead of extensions to SPSs, it may not be necessary for the bitstream to include the SPSs for each of the layers. Hence, the bitstream may be smaller by at least the number of bits needed to represent the base HEVC specification syntax elements of the SPSs. Furthermore, because the syntax elements are signaled in a VPS extension instead of extensions to SPSs, it may not be necessary to generate as many PPSs, further saving bits. Although the description of the techniques of this disclosure is provided with reference to HEVC, one or more of the techniques of this disclosure may be applicable to other video coding specifications.

Figure 5:
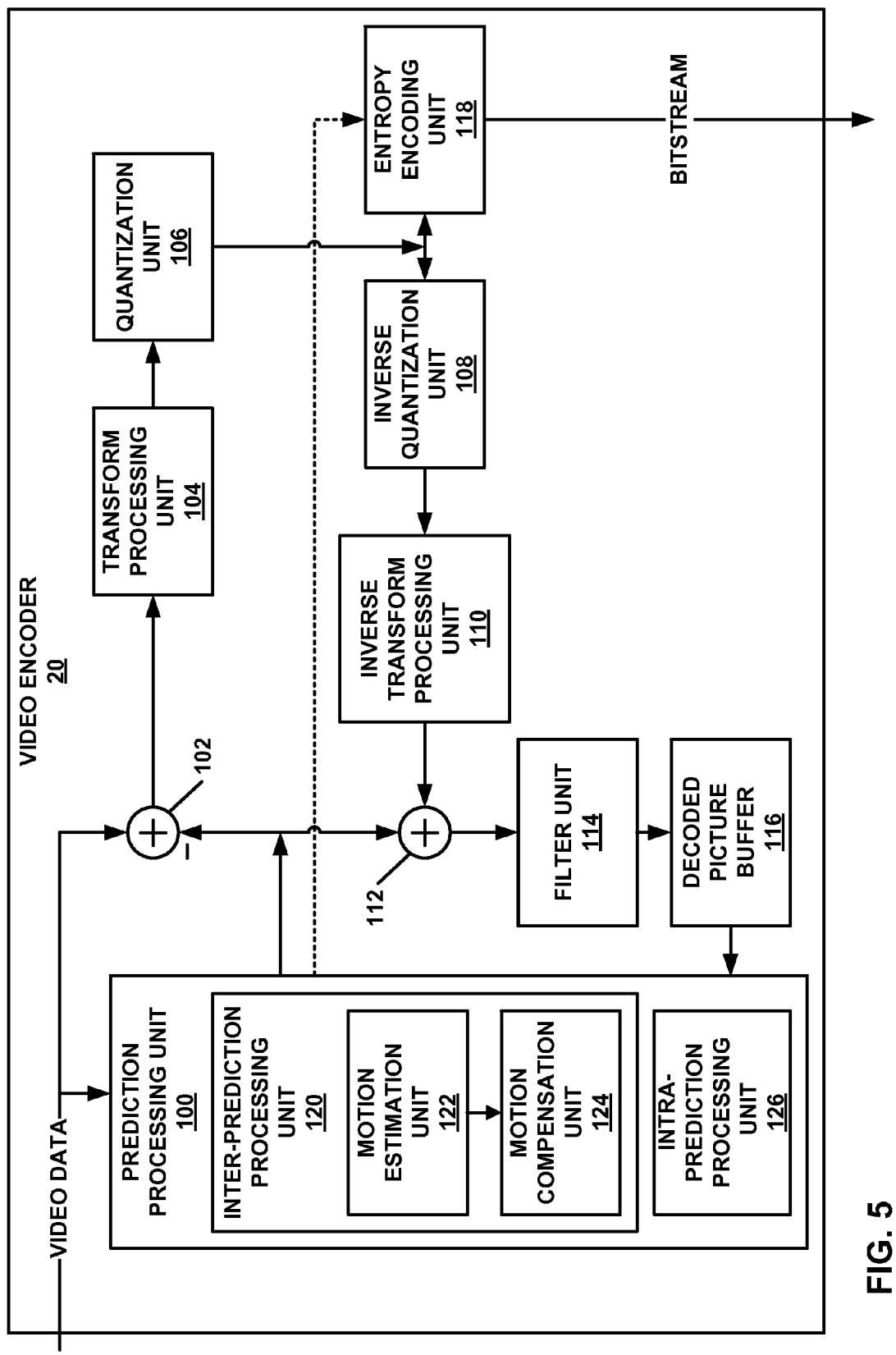
FIG. 5 is a block diagram illustrating an example video encoder that may implement the techniques described in this disclosure.

FIG. 5 is a block diagram illustrating an example video encoder 20 that may implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 5, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for video blocks encoded in I-mode, the predictive block is formed using spatial prediction from previously-encoded neighboring blocks within the same frame.

PUs in a P slice may be intra predicted or uni-directionally inter predicted. For instance, if a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely corresponds to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples associated with the reference location indicated by the motion vector of the PU.

PUs in a B slice may be intra predicted, uni-directionally inter predicted, or bi-directionally inter predicted. Hence, if a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples associated with the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples associated with the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Different intra prediction modes may be associated with different sets of samples of spatially-neighboring PUs. Intra-prediction processing unit 126 may use the particular samples associated with an intra prediction mode to generate a predictive block for the PU. The spatially-neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb, and Cr coding block of a CU and the selected predictive luma, Cb, and Cr blocks of the PUs of the CU, a luma, a Cb, and a Cr residual block of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU.

Transform processing unit 104 may generate coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. The bitstream may also include syntax elements that are not entropy encoded. In accordance with one or more example techniques of this disclosure, the bitstream may include a VPS that includes a VPS extension for a video coding extension. The VPS extension includes respective syntax elements for each respective layer of the video data bitstream. The syntax elements may indicate whether particular coding tools are enabled for respective layers.

Figure 6:
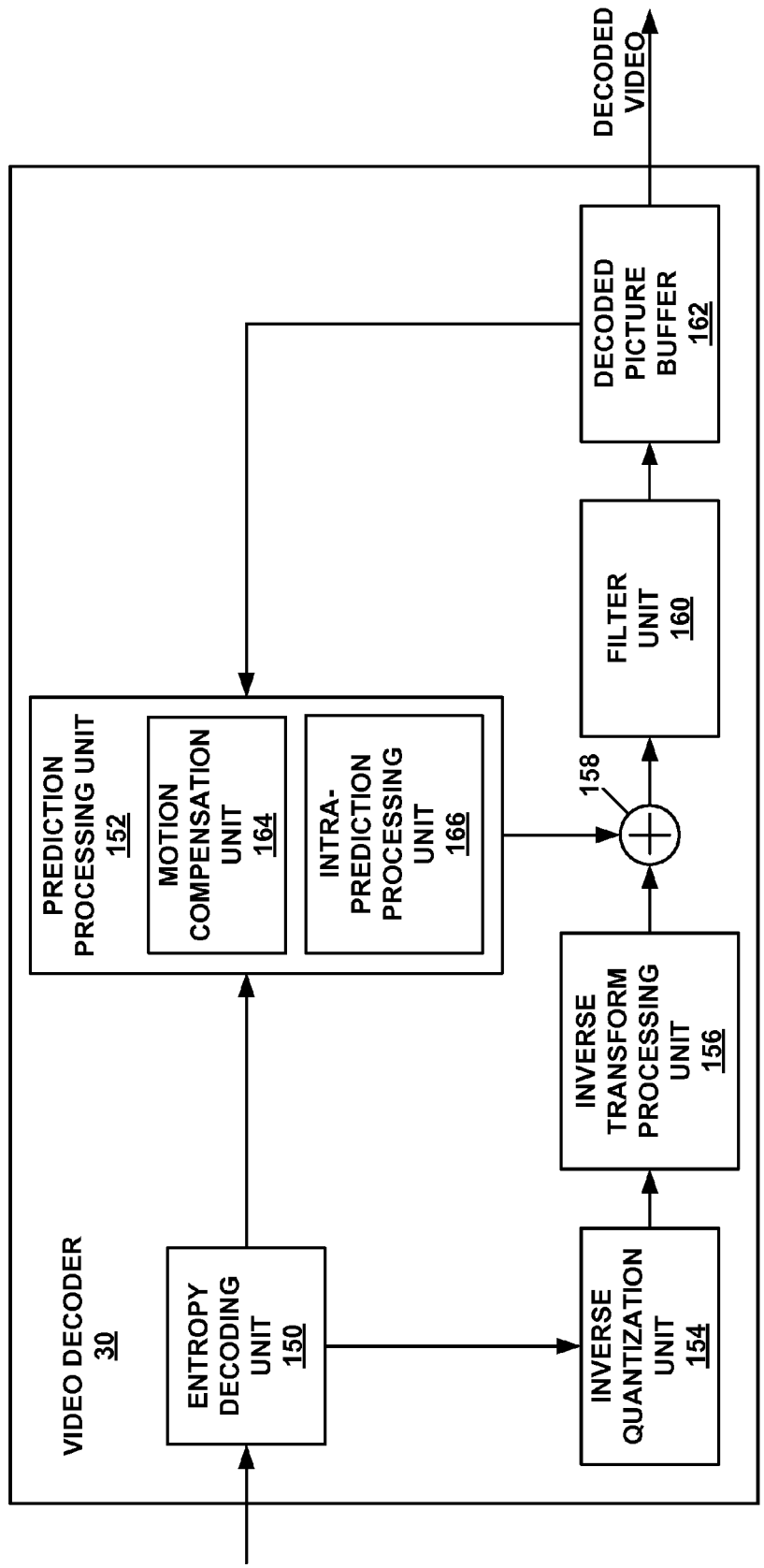
FIG. 6 is a block diagram illustrating an example video decoder that may implement the techniques described in this disclosure.

FIG. 6 is a block diagram illustrating an example video decoder 30 that may implement the techniques described in this disclosure. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 6, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Entropy decoding unit 150 may receive NAL units and parse the NAL units to obtain syntax elements from a bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained from the bitstream.

The NAL units of the bitstream may include coded slice NAL units. As part of decoding the bitstream, entropy decoding unit 150 may entropy decode certain syntax elements in the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to obtaining syntax elements from the bitstream, video decoder 30 may perform reconstruction operations on CUs. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements obtained from the bitstream.

Prediction processing unit 152 may construct a first reference picture list (RefPicList0) and a second reference picture list (RefPicList1) based on syntax elements obtained from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples associated with the one or more reference blocks for the PU, predictive luma, Cb and Cr blocks for the PU.

Reconstruction unit 158 may use the luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs. In this way, video decoder 30 may parse, from the bitstream, transform coefficient levels of the luma coefficient block, inverse quantize the transform coefficient levels, apply a transform to the transform coefficient levels to generate a transform block, generate, based at least in part on the transform block, a coding block, and output the coding block for display.

As indicated above, video encoder 20 may generate a VPS that includes a VPS extension for an HEVC extension, such as multi-view coding, 3DV, and SVC. Similarly, video decoder 30 may obtain, from a bitstream, a VPS extension for an HEVC extension. The VPS extension may include tool-enabling flags that indicate whether particular coding tools associated with the HEVC extension are enabled.

In a first example technique of this disclosure, the VPS extension may include tool-enabling flags that are applicable to all layers of the bitstream. In this first example technique, a VPS may have the syntax shown by Table 2, below.

TABLE 2

Video Parameter Set

| video_parameter_set_rbsp( ) { | Descriptor |
|---|---|
| video_parameter_set_id | u(4) |
| vps_temporal_id_nesting_flag | u(1) |
| vps_reserved_zero_2bits | u(2) |
| vps_reserved_zero_6bits | u(6) |
| vps_max_sub_layers_minus1 | u(3) |
| profile_tier_level( 1, vps_max_sub_layers_minus1 ) | |
| vps_reserved_zero_12bits | u(12) |
| for( i = 0; i <= vps_max_sub_layers_minus1; i++ ) { | |
|   vps_max_dec_pic_buffering[ i ] | ue(v) |
|   vps_max_num_reorder_pics[ i ] | ue(v) |
|   vps_max_latency_increase[ i ] | ue(v) |
| } | |
| vps_num_hrd_parameters | ue(v) |
| for( i = 0; i < vps_num_hrd_parameters; i++ ) { | |
|   if( i > 0 ) | |
|     op_point( i ) | |
|   hrd_parameters( i = = 0, vps_max_sub_layers_minus1 ) | |
| } | |
| bit_equal_to_one | f(1) |
| vps_extension( ) | |
| ... | |
|   rbsp_trailing_bits( ) | |
| } | |

In the first example technique of this disclosure, the semantics of the syntax elements of the VPS may remain the same as those described in HEVC Working Draft 8. However, as shown in Table 2, the VPS may include a vps_extension( ) syntax structure. Table 3, below, shows a syntax for the vps_extension( ) syntax structure in accordance with the first example technique of this disclosure.

TABLE 3

VPS Extension

| vps_extension( ) { | Descriptor |
|---|---|
|   while( !byte_aligned( ) ) | |
|     vps_extension_byte_alignment_reserved_one_bit | u(1) |
|   ... | |
|   interview_refs_present_flag | u(1) |
|   multi_view_mv_pred_flag | u(1) |
|   multi_view_residual_pred_flag | u(1) |
|   enable_dmm_flag | u(1) |
|   use_mvi_flag | u(1) |
|   ... | |
| } | |

In Table 3, the interview_refs_present_flag syntax element indicates whether inter-view reference is enabled. For example, the interview_refs_present_flag syntax element equal to 1 specifies that inter-view reference prediction is enabled for all pictures in all layers (excluding the pictures in the base view) referring to this VPS. The interview_refs_present_flag syntax element equal to 0 specifies that inter-view reference prediction is disabled for any picture in any layer referring to this VPS. Thus, the interview_refs_present_flag syntax element is a syntax element that indicates whether inter-view reference prediction is enabled for a set of applicable layers (i.e., all layers excluding the base view).

The multi_view_mv_pred_flag syntax element indicates whether inter-view motion vector prediction is enabled. For example, the multi_view_mv_pred_flag syntax element equal to 1 specifies that inter-view motion prediction is enabled for all pictures in all the layers (excluding the pictures in a base view) referring to this VPS. The multi_view_mv_pred_flag syntax element equal to 0 indicates that inter-view motion prediction is disabled for any picture in any layer referring to this VPS. Thus, the multi_view_mv_pred_flag syntax element is a syntax element that indicates whether inter-view motion prediction is enabled for a set of applicable layers (i.e., all layers excluding the base view).

The multi_view_residual_pred_flag indicates whether inter-view residual prediction is enabled. For example, the multi_view_residual_pred_flag syntax element equal to 1 specifies that inter-view residual prediction is enabled for all pictures in all the layers (excluding the pictures in the base view) referring to this VPS. The multi_view_residual_pred_flag syntax element equal to 0 indicates that inter-view residual prediction is disabled for any picture in any layer referring to this VPS. Thus, the multi_view_residual_pred_flag syntax element is a syntax element that indicates whether inter-view residual prediction is enabled for a set of applicable layers (i.e., all layers excluding the base view).

The enable_dmm_flag syntax element indicates whether depth map modeling (DMM) modes are enabled. For example, the enable_dmm_flag syntax element equal to 1 specifies that the DMM modes are enabled for all pictures in all the depth layers referring to this VPS. The enable_dmm_flag syntax element equal to 0 indicates that DMM modes are disabled for any picture in any layer referring to this VPS. Thus, the enable_dmm_flag syntax element is a syntax element that indicates whether DMM modes is enabled for a set of applicable layers (i.e., all depth layers).

The use_mvi_flag syntax element indicates whether motion vector inheritance (MVI) from texture to depth is enabled. For example, the use_mvi_flag syntax element equal to 1 specifies that the MVI is enabled for all pictures in all the depth layers referring to this VPS. The use_mvi_flag syntax element equal to 0 indicates that MVI is disabled for any picture in any layer referring to this VPS. Thus, the use_mvi_flag syntax element is a syntax element that indicates whether MVI is enabled for a set of applicable layers (i.e., all depth layers).

Furthermore, in the first example technique of this disclosure, video encoder 20 may generate a SPS that conforms to the syntax shown in Table 4, below.

TABLE 4

Sequence parameter set

| seq_parameter_set_rbsp( ) { | Descriptor |
|---|---|
| video_parameter_set_id | u(4) |
| sps_max_sub_layers_minus1 | u(3) |
| sps_reserved_zero_bit | u(1) |
| profile_and_level( 1, sps_max_sub_layers_minus1 ) | |
| seq_parameter_set_id | ue(v) |
| chroma_format_idc | ue(v) |
| if( chroma_format_idc = = 3 ) | |
|   separate_colour_plane_flag | u(1) |
| pic_width_in_luma_samples | ue(v) |
| pic_height_in_luma_samples | ue(v) |
| pic_cropping_flag | u(1) |
| if( pic_cropping_flag ) { | |
|   pic_crop_left_offset | ue(v) |
|   pic_crop_right_offset | ue(v) |
|   pic_crop_top_offset | ue(v) |
|   pic_crop_bottom_offset | ue(v) |
| } | |
| bit_depth_luma_minus8 | ue(v) |
| bit_depth_chroma_minus8 | ue(v) |
| pcm_enabled_flag | u(1) |
| if( pcm_enabled_flag ) { | |
|   pcm_sample_bit_depth_luma_minus1 | u(4) |
|   pcm_sample_bit_depth_chroma_minus1 | u(4) |
| } | |
| log2_max_pic_order_cnt_lsb_minus4 | ue(v) |
| for( i = 0; i <= sps_max_sub_layers_minus1; i++ ) { | |
|   sps_max_dec_pic_buffering[ i ] | ue(v) |
|   sps_max_num_reorder_pics[ i ] | ue(v) |
|   sps_max_latency_increase[ i ] | ue(v) |
| } | |
| restricted_ref_pic_lists_flag | u(1) |
| if( restricted_ref_pic_lists_flag ) | |
|   lists_modification_present_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if( pcm_enabled_flag ) { | |
|   log2_min_pcm_coding_block_size_minus3 | ue(v) |
|   log2_diff_max_min_pcm_coding_block_size | ue(v) |
| } | |
| max_transform_hierarchy_depth_inter | ue(v) |
| max_transform_hierarchy_depth_intra | ue(v) |
| scaling_list_enable_flag | u(1) |
| if( scaling_list_enable_flag ) { | |
|   sps_scaling_list_data_present_flag | u(1) |
|   if( sps_scaling_list_data_present_flag ) | |
|     scaling_list_data( ) | |
| } | |
| amp_enabled_flag | u(1) |
| sample_adaptive_offset_enabled_flag | u(1) |
| if( pcm_enabled_flag ) | |
|   pcm_loop_filter_disable_flag | u(1) |
| sps_temporal_id_nesting_flag | u(1) |
| num_short_term_ref_pic_sets | ue(v) |

TABLE 4-continued

Sequence parameter set

| seq_parameter_set_rbsp( ) { | Descriptor |
|---|---|
| for( i = 0; i < num_short_term_ref_pic_sets; i++) | |
|   short_term_ref_pic_set( i ) | |
| long_term_ref_pics_present_flag | u(1) |
| if( long_term_ref_pics_present_flag ) { | |
|   num_long_term_ref_pics_sps | ue(v) |
|   for( i = 0; i < num_long_term_ref_pics_sps; i++ ) { | |
|     lt_ref_pic_poc_lsb_sps[ i ] | u(v) |
|     used_by_curr_pic_lt_sps_flag[ i ] | u(1) |
|   } | |
| } | |
| sps_temporal_mvp_enable_flag | u(1) |
| vui_parameters_present_flag | u(1) |
| if( vui_parameters_present_flag ) | |
|   vui_parameters( ) | |
| ~~sps_3DVC_extension_present_flag~~ | ~~u(1)~~ |
| ~~if(sps_3DVC_extension_present_flag)~~ | |
|   ~~sps_3DVC_extension()~~ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

The semantics of the syntax elements shown in Table 4 may be the same as the corresponding syntax elements as described in HEVC Working Draft 8. The portions of Table 4 that have been struck through are portions included in the SPS in HEVC Working Draft 8, but are not present in the SPS (i.e., are proposed to be deleted in this example) in the first example technique of this disclosure. Thus, in accordance with the first example technique of this disclosure, the SPS does not include a sps_3DVC_extension_present_flag or a sps_3DVC_extension( ) syntax structure.

Furthermore, in the first example technique of this disclosure, the SPS extension 3DVC syntax structure may not be needed or at least the syntax elements present in the VPS do not need to be further present in the SPS. Thus, the sps_3DVC_extension( ) syntax structure may have the syntax shown in Table 5, below.

TABLE 5

SPS 3DVC Extension

| sps_3DVC_extension( ) { | Descriptor |
|---|---|
| ... | |
| ~~interview_refs_present_flag~~ | u(1) |
| ~~enable_dmm_flag~~ | u(1) |
| ~~if(depth_flag) {~~ | |
|   ~~use_mvi_flag~~ | u(1) |
| ~~}~~ | |
| ~~multi_view_mv_pred_flag~~ | u(1) |
| ~~multi_view_residual_pred_flag~~ | u(1) |
| ... | |
| } | |

The portions of Table 5 that have been struck through are portions included in the SPS 3DVC extension in HEVC Working Draft 8, but are not present in the SPS 3DVC extension in the first example technique of this disclosure. If all syntax elements present in the SPS 3DVC extension are present in the VPS, the SPS 3DVC extension may not be needed at all.

A second example technique of this disclosure is similar to the first example technique of this disclosure. However, in the second example technique of this disclosure, video encoder 20 generates (and video decoder 30 obtains) the tool-enabling flags for each layer. Relative to the first example technique, only the VPS extension syntax and semantics are changed in the second example technique. In accordance with the second example technique of this disclosure, the VPS extension may have the syntax shown by Table 6, below.

TABLE 6

| VPS Extension | |
| --- | --- |
| vps_extension( ) { | Descriptor |
|   while( !byte_aligned( ) ) | |
|   ... | |
|     vps_extension_byte_alignment_reserved_one_bit | u(1) |
|   for( i = 0; i <= vps_max_layers_minus1; i++ ) { | |
|   ... | |
|     interview_refs_present_flag[ i ] | u(1) |
|     multi_view_mv_pred_flag[ i ] | u(1) |
|     multi_view_residual_pred_flag[ i ] | u(1) |
|     if(depthFlag) { | |
|       enable_dmm_flag[ i ] | u(1) |
|       use_mvi_flag[ i ] | u(1) |
|     } | |
|   } | |
|   ... | |
| } | |

In Table 6, the depthFlag variable may be derived to be 0 for a texture layer and 1 for a depth layer. Each coded picture in a texture layer is a texture picture (i.e., a texture view component). Each coded picture in a depth layer is a depth picture (i.e., a depth view component). As shown in Table 6, the VPS extension includes a "for" loop that generates tool-enabling flags for each layer. In Table 6, the interview_refs_present_flag[i] syntax element indicates whether inter-view reference is enabled for layer i. For example, the interview_refs_present_flag[i] syntax element equal to 1 specifies that inter-view reference prediction is enabled for all pictures in the layer with layer identifier equal to i (i.e., the i-th layer) and referring to this VPS. The interview_refs_present_flag[i] syntax element equal to 0 specifies that inter-view reference prediction is disabled for any picture in the i-th layer referring to this VPS. Thus, the interview_refs_present_flag syntax element is a syntax element that indicates whether inter-view reference prediction is enabled for a set of applicable layers (i.e., layer i).

The multi_view_mv_pred_flag[i] syntax element indicates whether inter-view motion vector prediction is enabled for layer i. For example, the multi_view_mv_pred_flag[i] syntax element equal to 1 specifies that inter-view motion prediction is enabled for all pictures in the i-th layer referring to this VPS. The multi_view_mv_pred_flag[i] syntax element equal to 0 indicates that inter-view motion prediction is disabled for any picture in the i-th layer referring to this VPS. Thus, the multi_view_mv_flag syntax element is a syntax element that indicates whether inter-view motion prediction is enabled for a set of applicable layers (i.e., layer i).

The multi_view_residual_pred_flag[i] indicates whether inter-view residual prediction is enabled for layer i. For example, the multi_view_residual_pred_flag[i] syntax element equal to 1 specifies that inter-view residual prediction is enabled for all pictures in the i-th layer referring to this VPS. The multi_view_residual_pred_flag[i] syntax element equal to 0 indicates that inter-view residual prediction is disabled for any picture in the i-th layer referring to this VPS. Thus, the multi_view_residual_flag syntax element is a syntax element that indicates whether inter-view residual prediction is enabled for a set of applicable layers (i.e., layer i).

The enable_dmm_flag[i] syntax element indicates whether depth map modeling modes are enabled for layer i. For example, the enable_dmm_flag[i] syntax element equal to 1 specifies that the DMM modes are enabled for all pictures in the i-th layer referring to this VPS. The enable_dmm_flag[i] syntax element equal to 0 indicates that DMM modes are disabled for any picture in the i-th layer referring to this VPS. Thus, the enable_dmm_flag syntax element is a syntax element that indicates whether DMM modes are enabled for a set of applicable layers (i.e., layer i).

The use_mvi_flag[i] syntax element indicates whether motion vector inheritance from texture to depth is enabled for layer i. For example, the use_mvi_flag[i] syntax element equal to 1 specifies that the MVI is enabled for all pictures in the i-th layer referring to this VPS. The use_mvi_flag[i] syntax element equal to 0 indicates that MVI is disabled for any picture in the i-th layer referring to this VPS. Thus, the use_mvi_flag syntax element is a syntax element that indicates whether MVI is enabled for a set of applicable layers (i.e., layer i).

As shown in the example of Table 6, the VPS extension includes enable_dmm_flag[i] and use_mvi_flag[i] syntax elements when depthFlag is equal to 1. As indicated above, the depthFlag variable may be derived to be 0 for a texture layer and 1 for a depth layer. Thus, video decoder 30 may determine, based at least in part on whether a layer is a texture layer or a depth layer, whether the VPS extension includes a syntax element that indicates whether a coding tool is enabled for the layer. The coding tool may include use of inter-view references or the coding tool is use of depth map modeling modes. Moreover, video encoder 20 may determine, based at least in part on whether the respective layer is a texture layer or a depth layer, whether to include in the VPS extension the syntax element that indicates whether the coding tool is enabled for the respective layer. The coding tool may include use of inter-view references or the coding tool includes use of depth map modeling modes.

In a third example technique of this disclosure, the tool-enabling flags are associated with each operation point instead of being associated with each layer, as done in the second example technique. In the third example technique, the VPS extension may conform to the syntax shown in Table 7, below.

TABLE 7

| VPS Extension | |
| --- | --- |
| vps_extension( ) { | Descriptor |
|   while( !byte_aligned( ) ) | |
|     vps_extension_byte_alignment_reserved_one_bit | u(1) |
|   num_additional_layer_operation_points | u(8) |
|   ... | |
|   for( i = 1; i <= num_additional_layer_operation_points; i++ ) { | |
|     op_point( i ) | |
|     interview_refs_present_flag[ i ] | u(1) |
|     multi_view_mv_pred_flag[ i ] | u(1) |
|     multi_view_residual_pred_flag[ i ] | u(1) |
|     if(depthIncluded) { | |
|       enable_dmm_flag[ i ] | u(1) |
|       use_mvi_flag[ i ] | u(1) |
|     } | |
|   } | |
| } | |

In Table 7, the depthIncluded variable is derived to be 1 if the current operation point (i.e., operation point i) includes depth and 0 otherwise. Furthermore, in Table 7, the interview_refs_present_flag syntax element equal to 1 specifies that inter-view reference prediction is enabled for all pictures in all layers (excluding the pictures in the base view) of the current operation point referring to this VPS. The interview_refs_present_flag syntax element equal to 0 specifies that inter-view reference prediction is disabled for any picture in any layer of the current operation point referring to this VPS.

The multi_view_mv_pred_flag syntax element indicates whether inter-view motion vector prediction is enabled. For example, the multi_view_mv_pred_flag syntax element equal to 1 specifies that inter-view motion prediction is enabled for all pictures in all the layers (excluding the pictures in base view) of the current operation point referring to this VPS. The multi_view_mv_pred_flag syntax element equal to 0 indicates that inter-view motion prediction is disabled for any picture in any layer of the current operation point referring to this VPS.

The multi_view_residual_pred_flag indicates whether inter-view residual prediction is enabled. For example, the multi_view_residual_pred_flag syntax element equal to 1 specifies that inter-view residual prediction is enabled for all pictures in all the layers (excluding the pictures in base view) of the current operation point referring to this VPS. The multi_view_residual_pred_flag syntax element equal to 0 indicates that inter-view residual prediction is disabled for any picture in any layer of the current operation point referring to this VPS.

The enable_dmm_flag syntax element indicates whether depth map modeling modes are enabled. For example, the enable_dmm_flag syntax element equal to 1 specifies that the DMM modes are enabled for all pictures in all the depth layers of the current operation point referring to this VPS. The enable_dmm_flag syntax element equal to 0 indicates that DMM modes are disabled for any picture in any layer of the current operation point referring to this VPS.

The use_mvi_flag syntax element indicates whether motion vector inheritance from texture to depth is enabled. For example, the use_mvi_flag syntax element equal to 1 specifies that the MVI is enabled for all pictures in all the depth layers of the current operation point referring to this VPS. The use_mvi_flag syntax element equal to 0 indicates that MVI is disabled for any picture in any layer of the current operation point referring to this VPS.

In HEVC Working Draft 7, the SPS may contain a majority of the syntax elements that may be shared by enhancement views and/or enhancement layers. However, some syntax elements present in SPSs are not applicable to both views/layers. For example, syntax elements for profiles, levels, and/or HRD parameters may not be applicable to both views and/or enhancement layers. Furthermore, in a stereoscopic bitstream with a base view conforming to HEVC, a new instance of a SPS may be present, or the majority of the syntax elements may be needed to be present in the VPS. As a result, syntax elements may be duplicated.

In accordance with a fourth example technique of this disclosure, an SPS belonging to a lower layer (e.g., the base view) may be shared by multiple layers/views. For example, an SPS with a profile/level defined in the base specification may be reused by the view components at the enhancement layer. Furthermore, the profile and level related information, and/or HRD parameters in the SPS of the base layer/view may be ignored and such information may be present only in the VPS, even if the SPS is referred to by a higher layer or dependent view. In this design, video encoder 20 may signal the view dependency for the enhancement view as part of the VPS extension.

In the fourth example technique of this disclosure, a VPS may have the syntax shown in Table 8, below.

TABLE 8

Video parameter set

| video_parameter_set_rbsp( ) { | Descriptor |
|---|---|
| vps_max_temporal_layers_minus1 | u(3) |
| vps_max_layers_minus1 | u(5) |
| profile_space | u(3) |
| profile_idc | u(5) |
| for( j = 0; j < 32; j++ ) | |
|   profile_compatability_flag[ i ] | u(1) |
| constraint_flags | u(16) |
| level_idc | u(8) |
| level_lower_temporal_layers_present_flag | u(1) |
| if( level_lower_temporal_layers_present_flag ) | |
|   for( i = 0; i < vps_max_temporal_layers_minus1; i++ ) | |
|     level_idc_temporal_subset[ i ] | u(8) |
| video_parameter_set_id | u(5) |
| vps_temporal_id_nesting_flag | u(1) |
| ... | |
| bit_equal_to_one | u(1) |
| *profile_level_info* | |
| *( 0, vps_max_temporal_layers_minus1 )* | |
| *hrd_parameters( )* | |
| ... | |
| vps_extension2_flag | u(1) |
| if( vps_extension2_flag ) | |
|   while( more_rbsp_data( ) ) | |
|     vps_extension_data_flag | u(1) |
| } | |
| rbsp_trailing_bits( ) | |
| } | |

The italicized portions of Table 8 indicate portions that are not present in the VPS in HEVC Working Draft 7, and are added according to an example of this disclosure. In Table 8, hrd_parameters( ) is a syntax structure that includes HRD parameters. Furthermore, profile_level_info( . . . ) is a syntax structure that includes profile information. Table 9, below, shows an example syntax for the profile_level_info( . . . ) syntax structure.

TABLE 9

Profile Level Info

| profile_level_info( index, NumTempLevelMinus1 ) { | |
|---|---|
|   profile_space | u(3) |
|   profile_idc | u(5) |
|   for( j = 0; j < 32; j++ ) | |
|     profile_compatability_flag[ I ] | u(1) |
|   constraint_flags | u(16) |
|   level_idc | u(8) |
|   level_lower_temporal_layers_present_flag | u(1) |
|   if( level_lower_temporal_layers_present_flag ) | |
|     for ( i = 0; i < NumTempLevelMinus1; i++ ) | |
|       level_idc[ i ] | u(8) |
|   profileLevelInfoIdx = index | |
| } | |

The syntax elements in Table 9 may have the same semantics as corresponding SPS syntax elements in HEVC Working Draft 7.

Furthermore, in the fourth example technique of this disclosure, an SPS may have the syntax shown in Table 10, below.

TABLE 10

Sequence parameter set

| seq_parameter_set_rbsp( ) { | Descriptor |
|---|---|
| ~~profile_space~~ | ~~u(3)~~ |
| ~~profile_idc~~ | ~~u(5)~~ |

TABLE 10-continued

Sequence parameter set

| seq_parameter_set_rbsp( ) { | Descriptor |
|---|---|
| ~~constraint_flags~~ | ~~u(16)~~ |
| ~~level_idc~~ | ~~u(8)~~ |
| ~~for(i=0; i < 32; i++)~~ | |
| ~~profile_compatability_flag[i]~~ | ~~u(1)~~ |
| seq_parameter_set_id | ue(v) |
| video_parameter_set_id | ue(v) |
| chroma_format_idc | ue(v) |
| if( chroma_format_idc = = 3 ) | |
|   separate_colour_plane_flag | u(1) |
| sps_max_temporal_layers_minus1 | u(3) |
| pic_width_in_luma_samples | ue(v) |
| pic_height_in_luma_samples | ue(v) |
| pic_cropping_flag | u(1) |
| if( pic_cropping_flag ) { | |
|   pic_crop_left_offset | ue(v) |
|   pic_crop_right_offset | ue(v) |
|   pic_crop_top_offset | ue(v) |
|   pic_crop_bottom_offset | ue(v) |
| } | |
| bit_depth_luma_minus8 | ue(v) |
| bit_depth_chroma_minus8 | ue(v) |
| [Ed. (BB): chroma bit depth present in HM software but not used further ] | |
| pcm_enabled_flag | u(1) |
| if( pcm_enabled_flag ) { | |
|   pcm_sample_bit_depth_luma_minus1 | u(4) |
|   pcm_sample_bit_depth_chroma_minus1 | u(4) |
| } | |
| log2_max_pic_order_cnt_lsb_minus4 | ue(v) |
| for( i = 0; i <= sps_max_temporal_layers_minus1; i++ ) { | |
|   sps_max_dec_pic_buffering[ i ] | ue(v) |
|   sps_num_reorder_pics[ i ] | ue(v) |
|   sps_max_latency_increase[ i ] | ue(v) |
| } | |
| restricted_ref_pic_lists_flag | u(1) |
| if( restricted_ref_pic_lists_flag ) | |
|   lists_modification_present_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if( pcm_enabled_flag ) { | |
|   log2_min_pcm_coding_block_size_minus3 | ue(v) |
|   log2_diff_max_min_pcm_coding_block_size | ue(v) |
| } | |
| max_transform_hierarchy_depth_inter | ue(v) |
| max_transform_hierarchy_depth_intra | ue(v) |
| scaling_list_enable_flag | u(1) |
| if( scaling_list_enable_flag ) { | |
|   sps_scaling_list_data_present_flag | u(1) |
|   if( sps_scaling_list_data_present_flag ) | |
|     scaling_list_param( ) | |
| } | |
| chroma_pred_from_luma_enabled_flag | u(1) |
| transform_skip_enabled_flag | u(1) |
| seq_loop_filter_across_slices_enabled_flag | u(1) |
| asymmetric_motion_partitions_enabled_flag | u(1) |
| nsrqt_enabled_flag | u(1) |
| sample_adaptive_offset_enabled_flag | u(1) |
| adaptive_loop_filter_enabled_flag | u(1) |
| if( pcm_enabled_flag ) | |
|   pcm_loop_filter_disable_flag | u(1) |
| sps_temporal_id_nesting_flag | u(1) |
| [Ed. (BB): x y padding syntax missing here, present in HM software ] | |
| num_short_term_ref_pic_sets | ue(v) |
| for( i = 0; i < num_short_term_ref_pic_sets; i++) | |
|   short_term_ref_pic_set( i ) | |
| long_term_ref_pics_present_flag | u(1) |
| sps_temporal_mvp_enable_flag | u(1) |
| vui_parameters_present_flag | u(1) |
| if( vui_parameters_present_flag ) | |
|   vui_parameters( ) | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

The struck through portions of Table 10 indicate syntax elements that are present in the SPS of HEVC Working Draft 7, but not present in the SPS in the fourth example technique of this disclosure. In the fourth example technique of this disclosure, for a view or layer referring to a SPS, that has reserved_zero_6 bits (layer_id) not equal to 0, profile_space, constraint_flags, level_idc, and profile_compatability_flag [i], in the SPS are ignored by an operation point containing this view or layer. Similarly, the HRD parameters included in the SPS are not applicable to the operation point containing a view or layer with reserved_zero_6 bits not equal to 0, even the operation point refers to the SPS. This information, including profile, level and HRD parameters may be present in the VPS as part of the extension. In one example, an HEVC stereo bitstream contains only one SPS with sps_id equal to 0 and one VPS with vps_id equal to 0. sps_id may be a syntax element in an SPS that identifies the SPS. vps_id may be a syntax element in a VPS that identifies the VPS. In this example, the SPS contains a profile conforming to the HEVC main profile. Furthermore, in this example, all VCL NAL units refer to the same SPS with sps_id equal to 0 and the SPS refers to the VPS with vps_id equal to 0. In the VPS extension part of HEVC base view, profile related information for the stereoscopic video is specified together with HRD for the stereoscopic operation point. Consequently, the whole bitstream may contain just one VPS, one SPS and one PPS.

Figure 7:
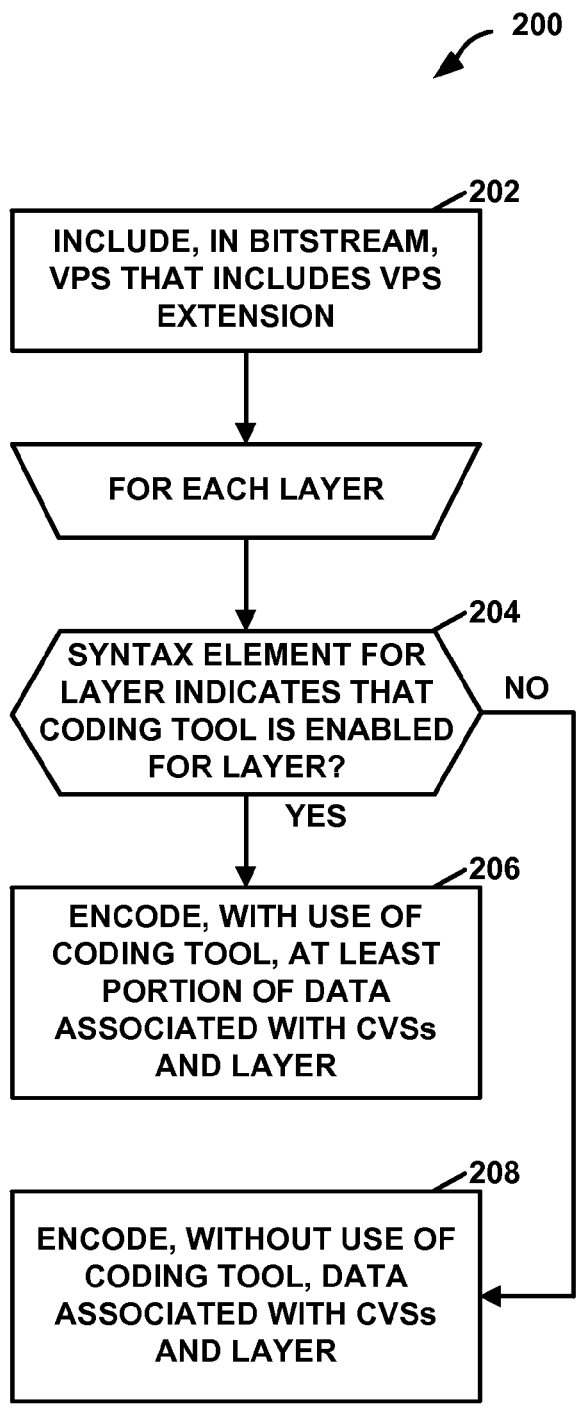
FIG. 7 is a flowchart illustrating an example operation of a video encoder, in accordance with one or more example techniques of this disclosure.

FIG. 7 is a flowchart illustrating an example operation 200 of video encoder 20, in accordance with one or more example techniques of this disclosure. In the example of FIG. 7, video encoder 20 may include, in a video data bitstream, a VPS that includes a VPS extension for a video coding extension (202). The VPS extension includes respective syntax elements for each respective layer of the video data bitstream. The VPS extension is a syntax structure that is applicable to one or more entire coded video sequences.

Furthermore, in the example of FIG. 7, for each respective layer of the video data bitstream, video encoder 20 may determine whether the syntax element for the respective layer indicates that a coding tool is enabled for the respective layer (204). When the syntax element for the respective layer indicates that the coding tool is enabled for the respective layer ("YES" of 204), video encoder 20 may encode, with use of the coding tool, at least a portion of video data that is associated with the one or more coded video sequences and that is associated with the respective layer (206). However, when the syntax element for the respective layer indicates that the coding tool is not enabled for the respective layer ("NO" of 204), video encoder 20 may encode, without use of the coding tool, the video data that is associated with the one or more coded video sequences and that is associated with the respective layer (208).

Figure 8:
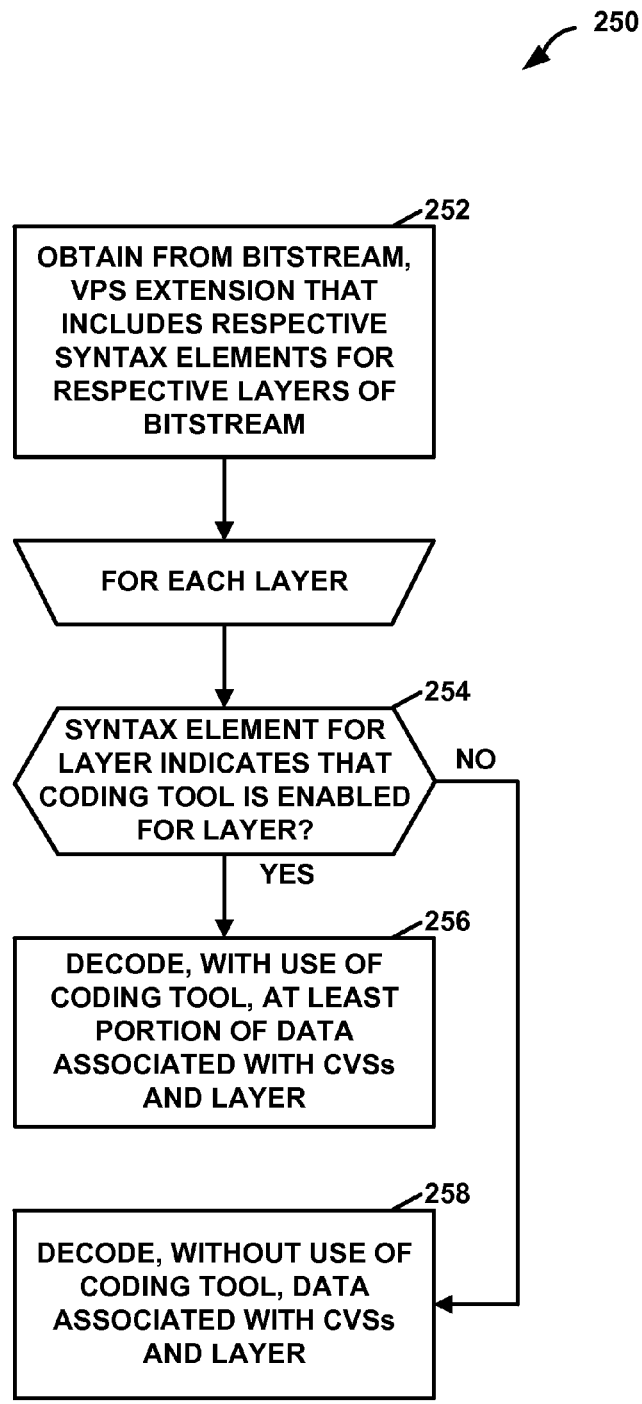
FIG. 8 is a flowchart illustrating an example operation of a video decoder, in accordance with one or more example techniques of this disclosure.

FIG. 8 is a flowchart illustrating an example operation 250 of video decoder 30, in accordance with one or more example techniques of this disclosure. In the example of FIG. 8, video decoder 30 obtains, from a video data bitstream, a VPS extension for a video coding extension (252). The VPS extension includes respective syntax elements for each respective layer of the video data bitstream. The VPS extension is a syntax structure that is applicable to one or more entire coded video sequences.

For each respective layer of the video data bitstream, video decoder 30 determines whether the syntax element for the respective layer indicates that a coding tool is enabled for the respective layer (254). When the syntax element for the respective layer indicates that the coding tool is enabled for the respective layer ("YES" of 254), video decoder 30 may decode, with use of the coding tool, at least a portion of video data that is associated with the one or more coded video sequences and that is associated with the respective layer (256). However, when the syntax element for the respective layer indicates that the coding tool is not enabled for the respective layer ("NO" of 254), video decoder 30 may decode, without use of the coding tool, the video data that is associated with the one or more coded video sequences and that is associated with the respective layer (258).

Figure 9:
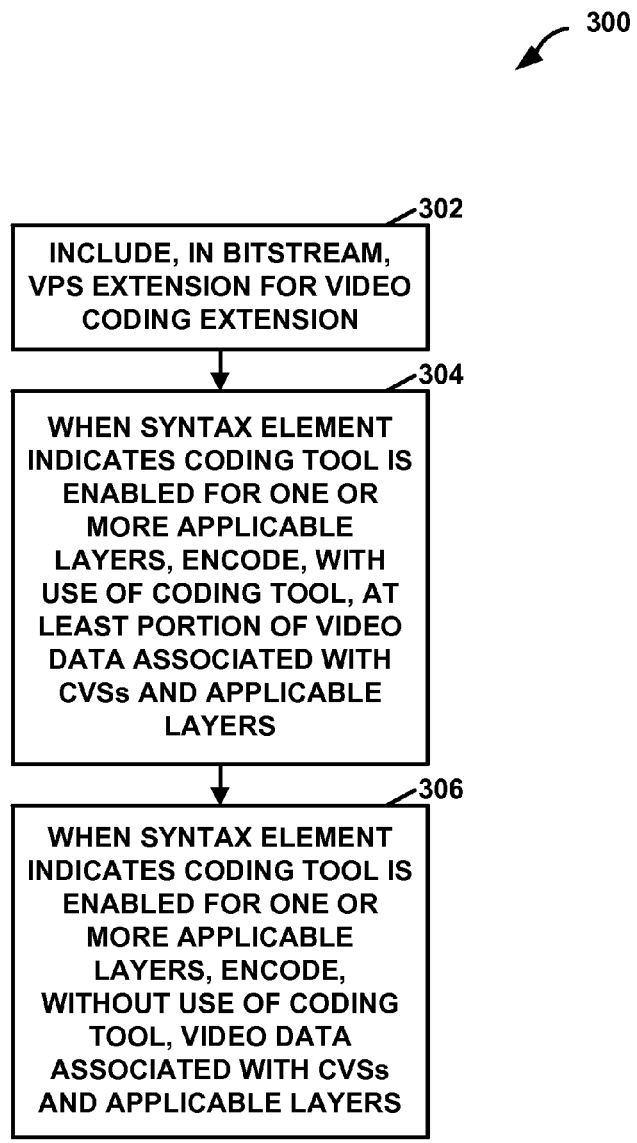
FIG. 9 is a flowchart illustrating an example operation of a video encoder, in accordance with one or more example techniques of this disclosure.

FIG. 9 is a flowchart illustrating an example operation 300 of video encoder 20, in accordance with one or more example techniques of this disclosure. In the example of FIG. 9, video encoder 20 may include, in a video data bitstream, a VPS extension for a video coding extension (302). The VPS extension may be a syntax structure within a VPS. The VPS may be a syntax structure that is applicable to one or more entire coded video sequences (CVSs). The VPS extension may include a syntax element that indicates whether a coding tool associated with the video coding extension is enabled for a set of applicable layers.

Furthermore, when the syntax element indicates that the coding tool is enabled for the set of applicable layers, video encoder 20 may encode, with use of the coding tool, at least a portion of video data that is associated with the one or more entire CVSs and that is associated with the set of applicable layers (304). When the syntax element indicates that the coding tool is not enabled for the set of applicable layers, video encoder 20 may encode, without use of the coding tool, the video data that is associated with the one or more CVSs and that is associated with the set of applicable layers (306). In this way, video encoder 20 may only encode video data that is associated with the one or more CVSs and that is associated with the set of applicable layers if the syntax element indicates that the coding tool is enabled for the set of applicable layers.

Figure 10:
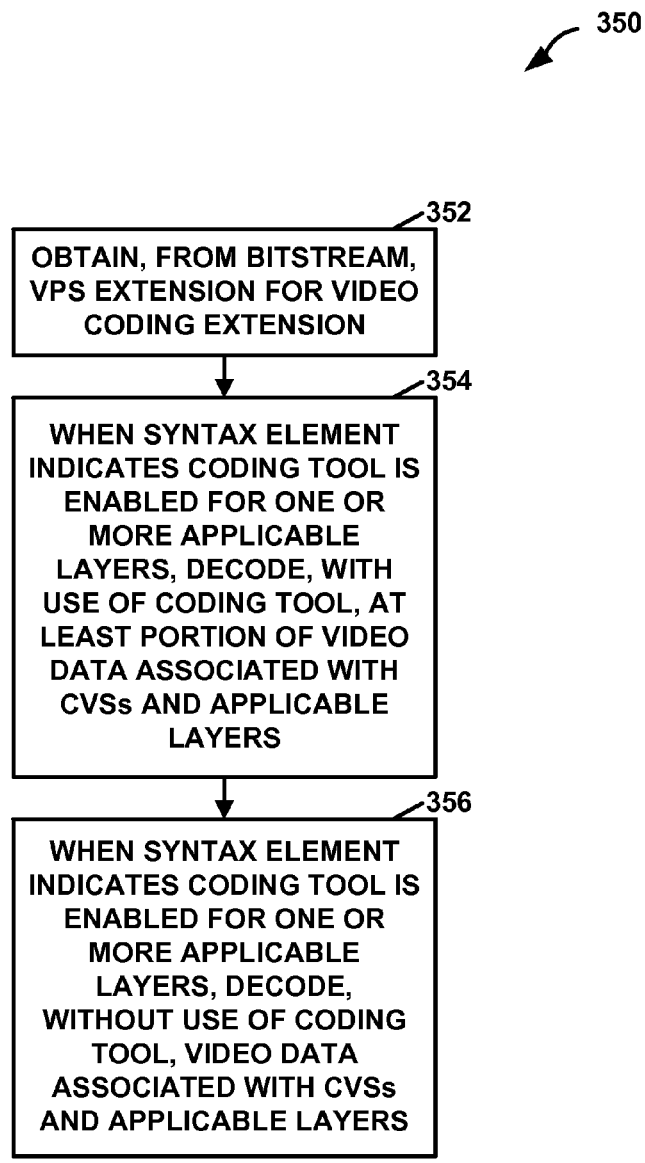
FIG. 10 is a flowchart illustrating an example operation of a video decoder, in accordance with one or more example techniques of this disclosure.

FIG. 10 is a flowchart illustrating an example operation of video decoder 30 in accordance with one or more techniques of this disclosure. In the example of FIG. 10, video decoder 30 may obtain, from a video data bitstream, a VPS extension for a video coding extension (352). The VPS extension may be a syntax structure within a VPS. The VPS itself may be a syntax structure that is applicable to one or more entire CVSs. The VPS extension may include a syntax element that indicates whether a coding tool associated with the video coding extension is enabled for a set of applicable layers.

When the syntax element indicates that the coding tool is enabled for the set of applicable layers, video decoder 30 may decode, with use of the coding tool, at least a portion of video data that is associated with the one or more entire CVSs and that is associated with the set of applicable layers (354). When the syntax element indicates that the coding tool is not enabled for the set of applicable layers, video decoder 30 may decode, without use of the coding tool, the video data that is associated with the one or more coded video sequences and that is associated with the set of applicable layers. In this way, video encoder 20 may only encode video data that is associated with the one or more CVSs and that is associated with the set of applicable layers if the syntax element indicates that the coding tool is enabled for the set of applicable layers.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    obtaining, from a video parameter set (VPS) extension for a video coding extension, a plurality of syntax elements, the VPS extension being a syntax structure within a VPS, the VPS being a syntax structure that is applicable to one or more entire coded video sequences, each of the syntax elements indicating whether a coding tool associated with the video coding extension is enabled for a single different layer from a plurality of layers;
    obtaining a plurality of sequence parameter sets (SPSs), each respective SPS of the plurality of SPSs including an identifier of the VPS;
    decoding the video data, wherein, for each respective syntax element in the plurality of syntax elements, when the respective syntax element indicates that the coding tool is not enabled for the respective layer in the plurality of layers, no picture of the video data that is in the respective layer and refers to the VPS is coded using the coding tool.

2. The method of claim 1, wherein the plurality of layers includes each layer of a video data bitstream except a base view of the video data bitstream.

3. The method of claim 1, wherein the plurality of layers includes each depth layer of a video data bitstream.

4. The method of claim 1, further comprising, for each respective layer of the plurality of layers, determining, based at least in part on whether the respective layer is a texture layer or a depth layer, whether the VPS extension includes a syntax element that indicates whether the coding tool is enabled for the respective layer.

5. The method of claim 1, wherein:
    the one or more entire coded video sequences are a first set of one or more entire coded video sequences, and
    wherein each respective SPS of the plurality of SPSs is a respective syntax structure that is applicable to a respective set of zero or more coded video sequences.

6. The method of claim 1, wherein the coding tool includes one of: use of inter-view references, use of depth map modeling modes, use of motion vector inheritance from texture to depth, use of inter-view motion vector prediction, or use of inter-view residual prediction.

7. The method of claim 1, wherein the video coding extension comprises one of a multi-view video coding extension, a scalable video coding (SVC) extension, or a 3D video coding (3DV) extension to High-Efficiency Video Coding (HEVC).

8. A video decoding device comprising:
    a data storage medium configured to store video data; and
    one or more processors configured to:
        obtain, from a video parameter set (VPS) extension for a video coding extension, a plurality of syntax elements, the VPS extension being a syntax structure within a VPS, the VPS being a syntax structure that is applicable to one or more entire coded video sequences, each of the syntax elements indicating whether a coding tool associated with the video coding extension is enabled for a single different layer from a plurality of layers;
        obtain a plurality of sequence parameter sets (SPSs), each respective SPS of the plurality of SPSs including an identifier of the VPS; and
        decode the video data, wherein, for each respective syntax element in the plurality of syntax elements, when the respective syntax element indicates that the coding tool is not enabled for the respective layer in the plurality of layers, no picture of the video data that is in the respective layer and refers to the VPS is coded using the coding tool.

9. The video decoding device of claim 8, wherein the plurality of layers includes each layer of a video data bitstream except a base view of the video data bitstream.

10. The video decoding device of claim 8, wherein the plurality of layers includes each depth layer of a video data bitstream.

11. The video decoding device of claim 8, wherein the one or more processors are configured to determine, for each respective layer of the plurality of layers, based at least in part on whether the respective layer is a texture layer or a depth layer, whether the VPS extension includes a syntax element that indicates whether the coding tool is enabled for the respective layer.

12. The video decoding device of claim 8, wherein:
    the one or more entire coded video sequences are a first set of one or more entire coded video sequences, and
    wherein each respective SPS of the plurality of SPSs is a respective syntax structure that is applicable to a respective set of zero or more coded video sequences.

13. The video decoding device of claim 8, wherein the coding tool includes one of: use of inter-view references, use of depth map modeling modes, use of motion vector inheritance from texture to depth, use of inter-view motion vector prediction, or use of inter-view residual prediction.

14. The video decoding device of claim 8, wherein the video coding extension comprises one of a multi-view video coding extension, a scalable video coding (SVC) extension, or a 3D video coding (3DV) extension to High-Efficiency Video Coding (HEVC).

15. A device for decoding video data, the device comprising:
    means for obtaining, from a video parameter set (VPS) extension for a video coding extension, a plurality of syntax elements, the VPS extension being a syntax structure within a VPS, the VPS being a syntax structure that is applicable to one or more entire coded video sequences, each of the syntax elements indicating whether a coding tool associated with the video coding extension is enabled for a single different layer from a plurality of layers;
    means for obtaining a plurality of sequence parameter sets (SPSs), each respective SPS of the plurality of SPSs including an identifier of the VPS; and
    means for decoding the video data, wherein, for each respective syntax element in the plurality of syntax elements, when the respective syntax element indicates that the coding tool is not enabled for the respective layer in the plurality of layers, no picture of the video data that is in the respective layer and refers to the VPS is coded using the coding tool.

16. A non-transitory computer-readable data storage medium having instructions stored thereon that, when executed, configure a device for decoding video data to:

obtain, from a video parameter set (VPS) extension for a video coding extension, a plurality of syntax elements, the VPS extension being a syntax structure within a VPS, the VPS being a syntax structure that is applicable to one or more entire coded video sequences, each of the syntax elements indicating whether a coding tool associated with the video coding extension is enabled for a single different layer from a plurality of layers;

obtain a plurality of sequence parameter sets (SPSs), each respective SPS of the plurality of SPSs including an identifier of the VPS; and decode the video data, wherein, for each respective syntax element in the plurality of syntax elements, when the respective syntax element indicates that the coding tool is not enabled for the respective layer in the plurality of layers, no picture of the video data that is in the respective layer and refers to the VPS is coded using the coding tool.

17. A method of encoding video data, the method comprising:

including, in a video parameter set (VPS) extension for a video coding extension, a plurality of syntax elements the VPS extension being a syntax structure within a VPS, the VPS being a syntax structure that is applicable to one or more entire coded video sequences, each of the syntax elements indicating whether a coding tool associated with the video coding extension is enabled for a single different layer from a plurality of layers;

including, in a plurality of sequence parameter sets (SPSs), an identifier of the VPS; and for each respective syntax element in the plurality of syntax elements, when the respective syntax element indicates that the coding tool is not enabled for the respective layer in the plurality of layers, encoding, without use of the coding tool, all pictures of the video data that are in the respective layer and refer to the VPS.

18. The method of claim 17, wherein the plurality of layers includes each layer of a video data bitstream except a base view of the video data bitstream.

19. The method of claim 17, wherein the plurality of layers includes each depth layer of a video data bitstream.

20. The method of claim 17, further comprising, for each respective layer of the plurality of layers, determining, based at least in part on whether the respective layer is a texture layer or a depth layer, whether to include in the VPS extension a syntax element that indicates whether the coding tool is enabled for the respective layer.

21. The method of claim 17, wherein:
the one or more entire coded video sequences are a first set of one or more entire coded video sequences, wherein each SPS of the plurality of SPSs is a respective syntax structure that is applicable to a respective set of zero or more coded video sequences.

22. The method of claim 17, wherein the coding tool includes one of: use of inter-view references, use of depth map modeling modes, use of motion vector inheritance from texture to depth, use of inter-view motion vector prediction, or use of inter-view residual prediction.

23. The method of claim 17, wherein the video coding extension comprises one of a multi-view video coding extension, a scalable video coding (SVC) extension, or a 3D video coding (3DV) extension to High-Efficiency Video Coding (HEVC).

24. A video encoding device comprising:
a data storage medium configured to store video data; and
one or more processors configured to:

include, in a video parameter set (VPS) extension for a video coding extension, a plurality of syntax elements, the VPS extension being a syntax structure within a VPS, the VPS being a syntax structure that is applicable to one or more entire coded video sequences, each of the syntax elements indicating whether a coding tool associated with the video coding extension is enabled for a single different layer from a plurality of applicable layers;

include, in a plurality of sequence parameter sets (SPSs), an identifier of the VPS; and for each respective syntax element in the plurality of syntax elements, when the respective syntax element indicates that the coding tool is not enabled for the respective layer in the plurality of layers, encode, without use of the coding tool, all pictures of the video data that are in the respective layer and refer to the VPS.

25. The video encoding device of claim 24, wherein the plurality of layers includes each layer of a video data bitstream except a base view of the video data bitstream.

26. The video encoding device of claim 24, wherein the plurality of layers includes each depth layer of a video data bitstream.

27. The video encoding device of claim 24,
wherein the one or more processors are further configured to determine, for each respective layer of the plurality of layers, based at least in part on whether the respective layer is a texture layer or a depth layer, whether to include in the VPS extension a syntax element that indicates whether the coding tool is enabled for the respective layer.

28. The video encoding device of claim 24, wherein:
the one or more entire coded video sequences are a first set of one or more entire coded video sequences, and
wherein each SPS of the plurality of SPSs is a respective syntax structure that is applicable to a respective set of zero or more coded video sequences.

29. The video encoding device of claim 24, wherein the coding tool includes one of: use of inter-view references, use of depth map modeling modes, use of motion vector inheritance from texture to depth, use of inter-view motion vector prediction, or use of inter-view residual prediction.

30. The video encoding device of claim 24, wherein the video coding extension comprises one of a multi-view video coding (MVC) extension, a scalable video coding (SVC) extension, or a 3D video coding (3DV) extension to High-Efficiency Video Coding (HEVC).

31. A video encoding device comprising:
means for including, in a a video parameter set (VPS) extension for a video coding extension, a plurality of syntax elements, the VPS extension being a syntax structure within a VPS, the VPS being a syntax structure that is applicable to one or more entire coded video sequences, each of the syntax elements indicating whether a coding tool associated with the video coding extension is enabled for a single different layer from a plurality of layers;

means for including, in a plurality of sequence parameter sets (SPSs), an identifier of the VPS; and for each respective syntax element in the plurality of syntax elements, means for encoding, when the respective syntax element indicates that the coding tool is not enabled for the respective layer in the plurality of layers, without use of the coding tool, all pictures of video data that are in the respective layer and refer to the VPS.

32. A non-transitory computer-readable data storage medium having instructions stored thereon that, when executed, configure a video encoding device to:
- include, in a video parameter set (VPS) extension for a video coding extension, a plurality of syntax elements, the VPS extension being a syntax structure within a VPS, the VPS being a syntax structure that is applicable to one or more entire coded video sequences, each of the syntax elements indicating whether a coding tool associated with the video coding extension is enabled for a single different layer from a plurality of layers;
- include, in a plurality of sequence parameter sets (SPSs), an identifier of the VPS; and
- for each respective syntax element in the plurality of syntax elements, when the respective syntax element indicates that the coding tool is not enabled for the respective layer in the plurality of layers, encode, without use of the coding tool, all pictures of the video data that are in the respective layer and refer to the VPS.

33. The video decoding device of claim 8, wherein the video decoding device comprises at least one of:
- an integrated circuit;
- a microprocessor; or
- a wireless communication device.

34. The video encoding device of claim 24, wherein the video encoding device comprises at least one of:
- an integrated circuit;
- a microprocessor; or
- a wireless communication device.

35. The video decoding device of claim 8, further comprising a display configured to display the decoded video data.

36. The video encoding device of claim 24, further comprising a camera configured to capture the video data.

* * * * *